(12) United States Patent
Das

(10) Patent No.: US 12,259,850 B2
(45) Date of Patent: *Mar. 25, 2025

(54) SPACE EFFICIENT DISTRIBUTED STORAGE SYSTEMS

(71) Applicant: Red Hat, Inc., Raleigh, NC (US)

(72) Inventor: Gobinda Das, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/087,785

(22) Filed: Dec. 22, 2022

(65) Prior Publication Data

US 2023/0136106 A1 May 4, 2023

Related U.S. Application Data

(63) Continuation of application No. 16/192,004, filed on Nov. 15, 2018, now Pat. No. 11,550,755.

(51) Int. Cl.
*G06F 16/172* (2019.01)
*G06F 16/13* (2019.01)
*G06F 16/17* (2019.01)
*G06F 16/174* (2019.01)
(Continued)

(52) U.S. Cl.
CPC .......... *G06F 16/172* (2019.01); *G06F 16/137* (2019.01); *G06F 16/1734* (2019.01); *G06F 16/1744* (2019.01); *G06F 16/182* (2019.01); *G06F 16/27* (2019.01)

(58) Field of Classification Search
CPC ...... G06F 16/172; G06F 16/27; G06F 16/182; G06F 16/137; G06F 16/1744; G06F 16/1734
See application file for complete search history.

(56) References Cited

U.S. PATENT DOCUMENTS

| 7,424,592 B1* | 9/2008 | Karr ..................... G06F 3/0605 |
| | | 711/203 |
| 7,836,271 B1 | 11/2010 | Dalal et al. |
| 7,921,179 B1 | 4/2011 | Zheng et al. |

(Continued)

OTHER PUBLICATIONS

Paulo, João, and José Pereira. "Efficient deduplication in a distributed primary storage infrastructure." ACM Transactions on Storage (TOS) 12.4 (Year: 2016).*

(Continued)

*Primary Examiner* — Mohsen Almani
(74) *Attorney, Agent, or Firm* — Kilpatrick Townsend & Stockton LLP

(57) ABSTRACT

Space efficient distributed storage systems are disclosed. For example, A system comprising a distributed storage volume (DSV) deployed on a plurality of hosts, the DSV comprising logical volumes, the logical volumes deployed on physical storage devices; and a first host of the plurality of hosts with a local cache, and a storage controller, the storage controller executing on a processor to receive a request relating to a first file; query the DSV to determine whether a second file that is a copy of the first file is stored in the DSV; and based on determining from the querying that the second file resides in a logical volume of the logical volumes in the DSV, store a separate reference to the second file in at least one logical volume of the DSV, wherein the separate reference is a virtual reference or link to the second file.

20 Claims, 10 Drawing Sheets

(51) Int. Cl.
*G06F 16/182* (2019.01)
*G06F 16/27* (2019.01)

(56) References Cited

U.S. PATENT DOCUMENTS

| | | | |
|---|---|---|---|
| 8,015,355 B1 | 9/2011 | Smith et al. | |
| 8,099,571 B1 * | 1/2012 | Driscoll | G06F 3/0613 |
| | | | 711/149 |
| 8,321,643 B1 * | 11/2012 | Vaghani | G06F 3/0665 |
| | | | 711/E12.002 |
| 8,805,901 B1 | 8/2014 | Jacobs et al. | |
| 9,251,531 B2 | 2/2016 | Sarkissian | |
| 9,471,593 B1 | 10/2016 | Anderson et al. | |
| 9,940,203 B1 | 4/2018 | Ghatnekar et al. | |
| 2002/0124137 A1 | 9/2002 | Ulrich et al. | |
| 2004/0117438 A1 | 6/2004 | Considine et al. | |
| 2007/0208790 A1 * | 9/2007 | Reuter | G06F 12/0253 |
| 2008/0224902 A1 * | 9/2008 | Samuels | H03M 7/3084 |
| | | | 341/51 |
| 2011/0153697 A1 | 6/2011 | Nickolov et al. | |
| 2011/0320556 A1 | 12/2011 | Reuther | |
| 2013/0007183 A1 | 1/2013 | Sorenson et al. | |
| 2013/0117240 A1 | 5/2013 | Taylor et al. | |
| 2013/0282790 A1 | 10/2013 | Catmull et al. | |
| 2014/0006354 A1 | 1/2014 | Parkinson et al. | |
| 2014/0006465 A1 | 1/2014 | Davis et al. | |
| 2014/0366019 A1 | 12/2014 | Bajaj et al. | |
| 2018/0121362 A1 | 5/2018 | Garg et al. | |
| 2018/0203681 A1 | 7/2018 | Acharya | |
| 2019/0121346 A1 | 4/2019 | Cella et al. | |
| 2020/0005015 A1 | 1/2020 | Liang et al. | |

OTHER PUBLICATIONS

Hong, Bo, et al. "Duplicate data elimination in a SAN file system." (Year: 2004).*

Xu, Lianghong, et al. "Online deduplication for databases." Proceedings of the 2017 ACM International Conference on Management of Data. (Year: 2017).*

Hansen, Jacob Gorm, and Eric Jul. "Scalable virtual machine storage using local disks." ACM SIGOPS Operating Systems Review 44.4 (2010): 71-79. (Year: 2010).*

Zhao, Xun, et al. "Liquid: A scalable deduplication file system for virtual machine images." IEEE transactions on parallel and distributed systems 25.5 (2013): 1257-1266. (Year: 2013).*

Deploying Red Hat Hyperconverged Infrastructure; Instructions for deploying Red Hat Hyperconverged Infrastructure; Laura Bailey; https://access.redhat.com/documentation/en-us/red_hat_hyperconverged_infrastructure/1.0/html-single/deploying_red_hat_hyperconverged_infrastructure/index retrieved Nov. 14, 2018 (50 pages).

Strategies for Managing the Performance Impacts of Data Efficiency in Hyperconverged Systems by George Crump; https://storageswiss.com/2016/08/02/strategies-for-managing-the-performance/; Aug. 2, 2016; retrieved Sep. 27, 2018; pp. 1-7.

Chapter 29. VDO Integration; https://access.redhat.com/documentation/en-us/red_hat_enterprise_linux/7-beta/html/storage_administration_guide/VDO-integration#vdo-ig-vdo_stack; retrieved Oct. 1, 2018; pp. 1-8.

* cited by examiner

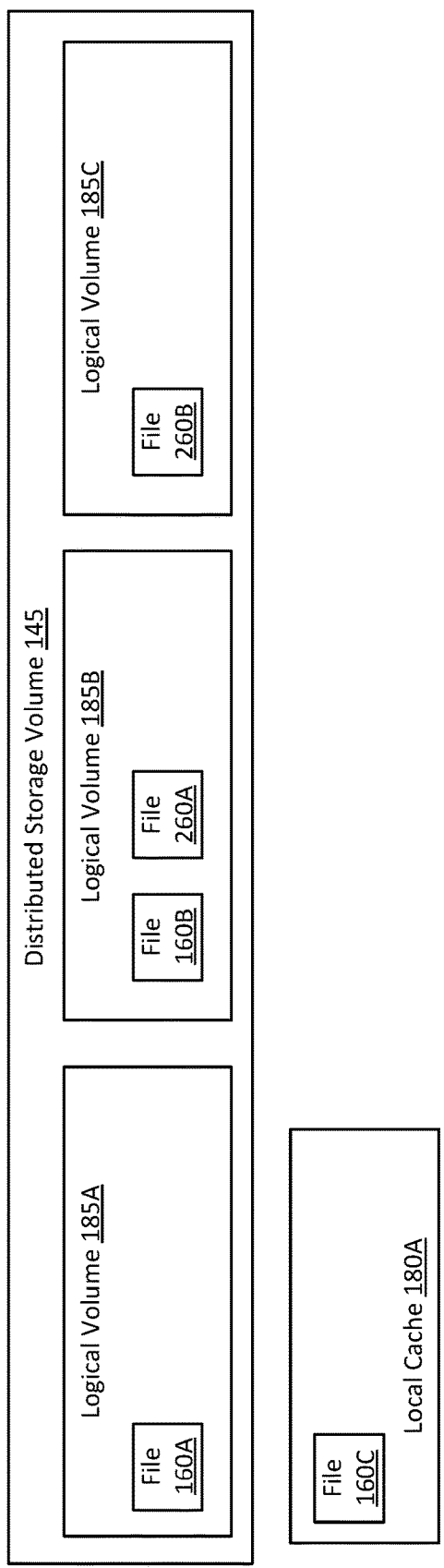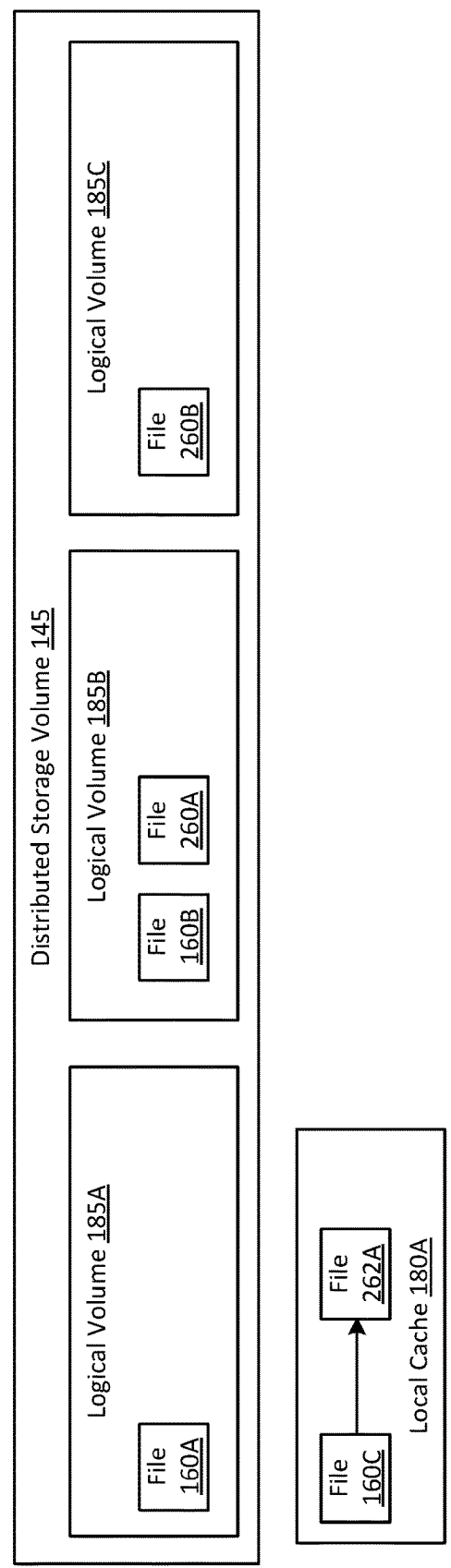

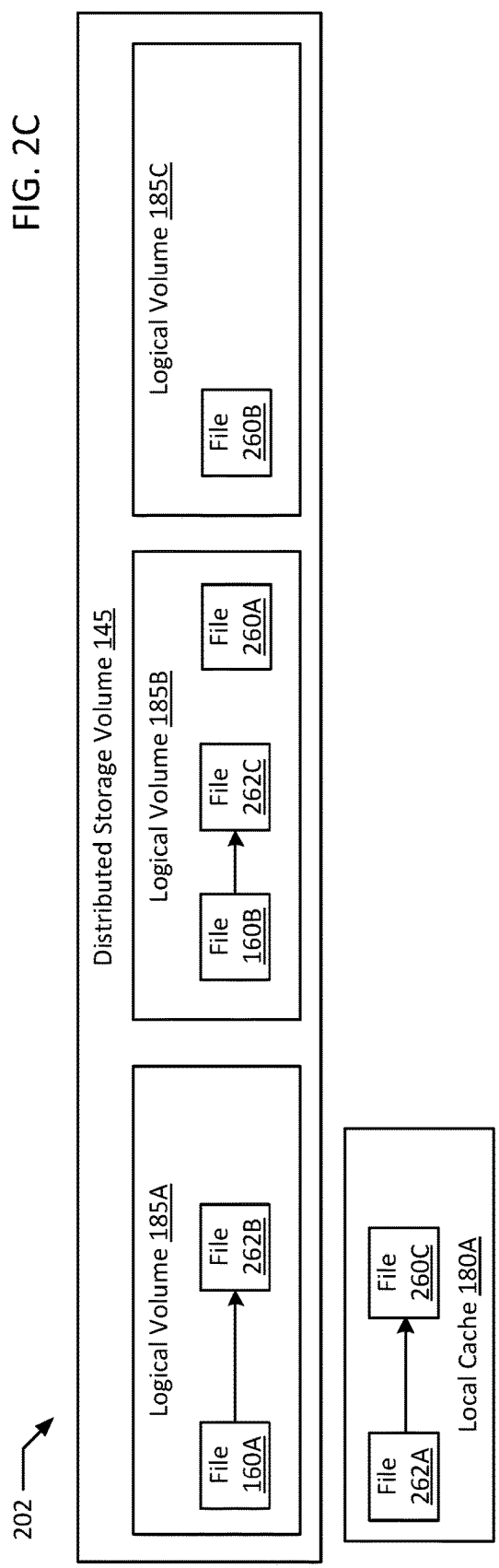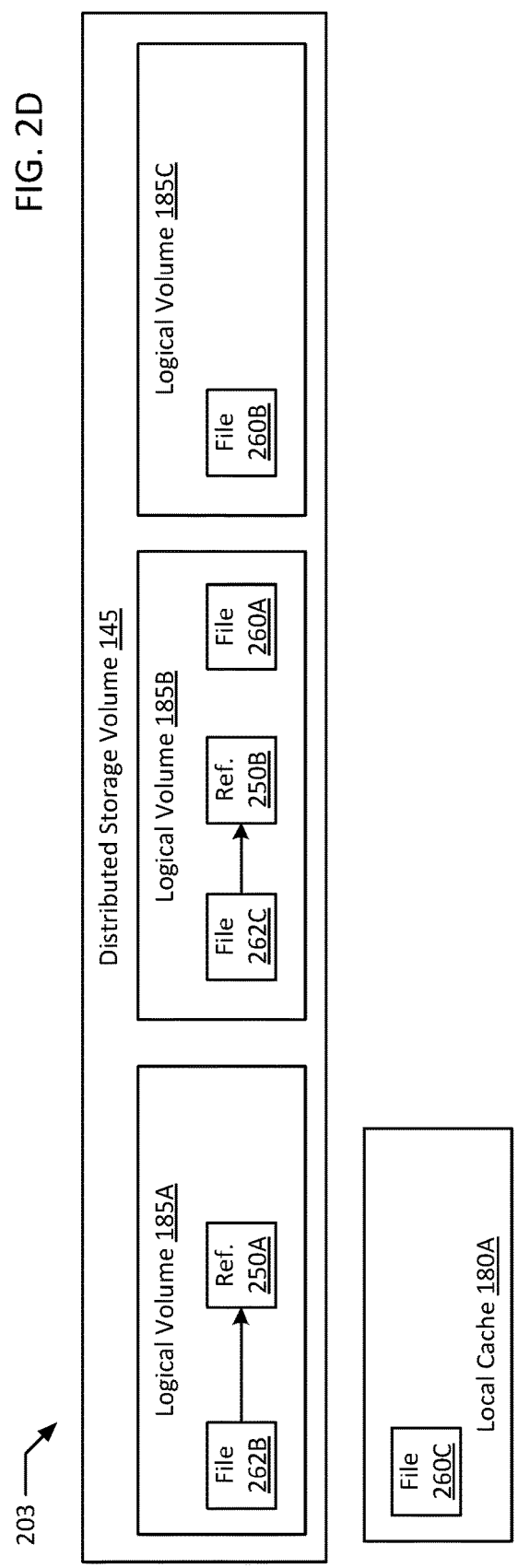

SPACE EFFICIENT DISTRIBUTED STORAGE SYSTEMS

CROSS-REFERENCE TO RELATED APPLICATIONS

The present application is a continuation application and claims the priority benefit of parent application Ser. No. 16/192,004, titled "HIGH PERFORMANCE SPACE EFFICIENT DISTRIBUTED STORAGE", filed on Nov. 15, 2018.

BACKGROUND

The present disclosure generally relates to shared computing environments such as multi-tenant cloud environments. Specifically, shared computing environments, whether public or privately implemented within an organization, typically employ orchestration of the deployment of isolated guests that perform the computing tasks in the networked computer systems, allowing computing power to be flexibly deployed in response to current processing needs. Isolated guests enable applications to be quickly deployed to scale to the volume of traffic requesting the applications, and allow these applications to be deployed in a variety of hardware environments. Multiple guests may also be clustered together to perform a more complex function than the respective containers are capable of performing individually. Many applications require persistent storage to store a current execution state and therefore persistent storage may be provisioned and allocated to the guests executing in a computing environment. Storage deployed in close physical proximity to processing tasks may provide higher performance than remotely located storage, and therefore deploying storage in conjunction to computing power may be advantageous.

SUMMARY

The present disclosure provides a new and innovative system, methods and apparatus for high performance space efficient distributed storage. In an example, a distributed storage volume (DSV) deployed on a plurality of hosts, the DSV comprising logical volumes, the logical volumes deployed on physical storage devices; and a first host of the plurality of hosts with a local cache, and a storage controller, the storage controller executing on a processor to receive a request relating to a first file; query the DSV to determine whether a second file that is a copy of the first file is stored in the DSV; and based on determining from the querying that the second file already resides in a logical volume of the logical volumes in the DSV, store a separate reference to the second file in at least one logical volume of the DSV, wherein the separate reference is a virtual reference or link to the second file.

Additional features and advantages of the disclosed method and apparatus are described in, and will be apparent from, the following Detailed Description and the Figures.

BRIEF DESCRIPTION OF THE FIGURES

FIGS. 2A-D are block diagrams of local caching and file deduplication in a high performance space efficient distributed storage system according to an example of the present disclosure.

DETAILED DESCRIPTION OF EXAMPLE EMBODIMENTS

Figure 1A:
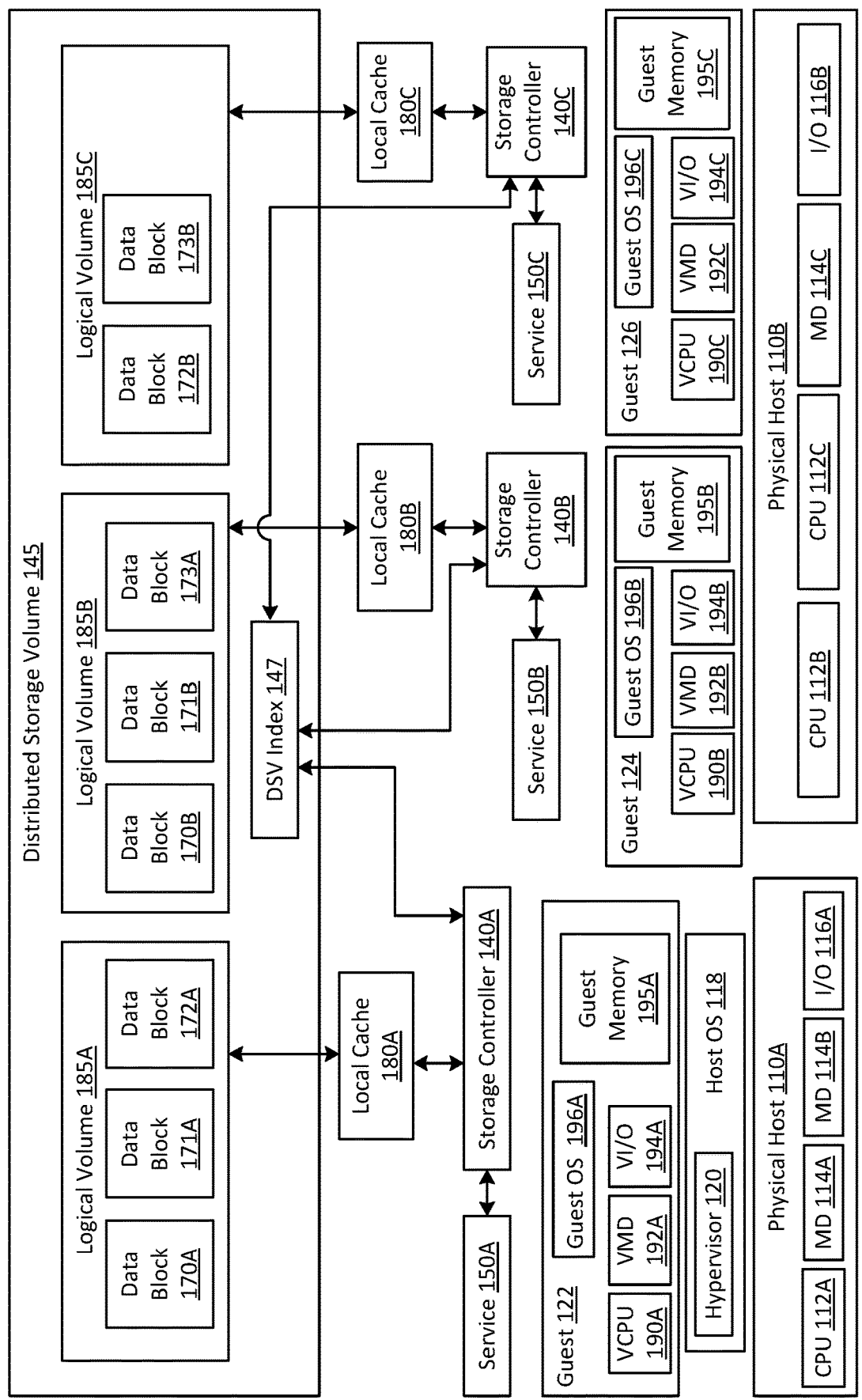
FIGS. 1A-B are block diagrams of a distributed storage system according to an example of the present disclosure.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®), generally respond to frequent container startups and cleanups with low latency. Containers may enable wide spread, parallel deployment of computing power for specific tasks. In a typical example, a container may be instantiated to process a specific task and reaped after the task is complete.

Many network applications, such as those hosted on containers in multi-tenant clouds, may require the saving of an execution state for a particular user accessing the application. For example, an online game may require the saving of game progress; an e-commerce site may require the saving of payment information and shopping carts; and a social media site may require the saving of interactions with a given post. Many applications may save data in the background for future interactions, for example, customizable interface settings and display preferences. Where settings and/or data require long term storage so that the data is available in future sessions of the application, storage that persists past the termination of a container executing the application may be required. Such applications may typically be referred to as stateful, in contrast to stateless applications where each interaction with the application is effectively independent of a subsequent interaction (e.g., web search, voice over internet protocol, video conferencing). In a typical example, such persistent storage implementations may store data in devices such as hard drive disks ("HDD"), solid state drives ("SSD"), and/or persistent memory (e.g., Non-Volatile Dual In-line Memory Module ("NVDIMM")).

In a typical example, dedicated storage units may be connected to a network with hosts hosting containers executing stateful applications to store the execution states of these applications. In an example, the dedicated storage units may be in the form of Network Attached Storage ("NAS") and/or Storage Area Networks ("SAN"). Both NAS and SAN systems typically include replication of data to prevent against data loss due to a failure in any one device. This replication may be implemented through a redundant array of independent disks ("RAID") setup. RAID arrays may be designed to increase performance, to provide live data backup, or a combination of both.

A notable disadvantage of NAS and SAN systems, however, is that an initial access of data across a network is typically orders of magnitude slower than accessing storage locally located on the same physical device as an application server. While the time lost starting any data operation may be inconsequential compared to the transfer time of a large file, for a small file, this initial startup cost may take significantly longer than the entire storage operation. Therefore, especially for systems with high performance requirements where microseconds of latency are significant, centralized storage options like NAS and SAN systems may represent a performance bottleneck. In addition, a given storage node may be compatible with only certain operating systems further reducing deployment flexibility.

A software alternative to physical NAS and SAN systems is distributed file systems such as GlusterFS®. With a distributed file system, artificial storage volumes may be configured from a pool of storage space networked together over a networking protocol such as transmission control protocol/internet protocol ("TCP/IP"). In typical implementations, these pooled storage volumes may experience some performance bottlenecks that do not apply to NAS or SAN systems deployed on dedicated storage hardware. For example, since GlusterFS® can assemble logical storage units from physical hardware located in different physical locations, additional network latency delays may be added to data storage, retrieval, replication, and other operations. While there is also additional latency accessing network storage in general as compared to local storage on the same physical hardware as the application accessing the storage, the various physical storage units within a NAS or SAN device are typically in the same physical hardware node providing a given logical storage node. This allows typical NAS or SAN implementations to avoid significant networking latency in data operations between various physical devices used to implement a NAS or SAN storage volume. However, since a logical storage volume in a distributed file system may be spread across many different physical hosts, internal communications between different physical devices within the same logical storage volume incur additional network latency as compared to dedicated physical storage devices, and this network latency may be detrimental to many computing tasks.

Distributed file systems do, however, offer significant advantages. Distributed file systems enable the creation of massive storage arrays (e.g., in the petabyte range) from excess capacity on commoditized hardware thereby increasing storage utilization on this hardware. Distributed file systems also offer scalability and ease of deployment especially in an environment like a multi-tenant cloud, which is advantageous particularly in combination with the hardware utilization benefits by allowing unused storage space on various physical hardware nodes in the cloud environment to provide storage for other services hosted in the cloud. Deployment of distributed storage may also be orchestrated by a container orchestration service (e.g., Kubernetes®) allowing for flexible storage scaling with processing demands.

The present disclosure aims to address performance penalties and bottlenecks with typical distributed storage systems and dedicated storage nodes. For example, typically, distributed file systems may require more complex indexing than dedicated storage devices to locate data on disparate storage devices, and each of these devices may be equipped with lower performance storage devices than a dedicated storage node. In addition, while dedicated storage may be deployed in close physical proximity to the processing nodes served by the dedicated storage (e.g., a dedicated storage node deployed as part of a rack or bank of servers serving the servers collocated with the dedicated storage node), distributed storage systems are typically deployed across numerous devices that may be physically significantly further away from each other (e.g., in different data centers). Therefore distributed storage systems may incur significant network latency in replicating data between different nodes. In addition, if a program requires data from a physically distant node of a distributed storage system, there may be significant added latency for data storage and manipulation operations (e.g., waiting for a network operation for storing and/or retrieving data).

Systems and methods described in the present disclosure overcome these performance penalties with a layer of highly converged local caching to typical distributed storage systems deployed on the same physical device as the applications requiring storage. By employing a storage controller that redirects access to the distributed storage system through this localized cache, and then lazily updating the distributed file system, the access (e.g., read, write, execute) latency penalties associated with distributed storage systems may be mostly overcome. Since these local caches are deployed in even closer proximity to the applications they serve than typical dedicated storage implementations, storage operations involving data in these local caches may deliver higher performance than typically possible with dedicated storage implementations once data becomes cached locally. In addition, since the distributed storage system itself is only lazily updated, processing intensive operations such as compression and deduplication may be performed in the background before data is synchronized from local caches to the distributed storage system resulting in significant storage space savings. By enabling space saving features such as compression and deduplication without incurring significant data access performance penalties significant improvements in storage density and storage hardware efficiency may be realized. In addition to space savings, the described local cache implementations also result in higher storage input/output throughput and performance.

Distributed file systems may be configured to be deployed in virtualized form. For example, a storage guest (e.g., container or VM) may be configured to add unused physical storage capacity from a physical server hosting the guest in a multi-tenant cloud to a distributed storage node. This storage guest may then become an access point that provides a low latency data storage for guests executing applications and services on the same physical hardware. A distributed file system also enables replication of the data to other nodes of the distributed file system over a network resulting in security for the data against loss due to hardware malfunctions or natural or manmade disasters. Replication across a network may typically be slower than replication within a single hardware node due to network latency, but spreading data to multiple geographical locations decreases the chances of losing access to the data due to isolated events.

Figure 1B:
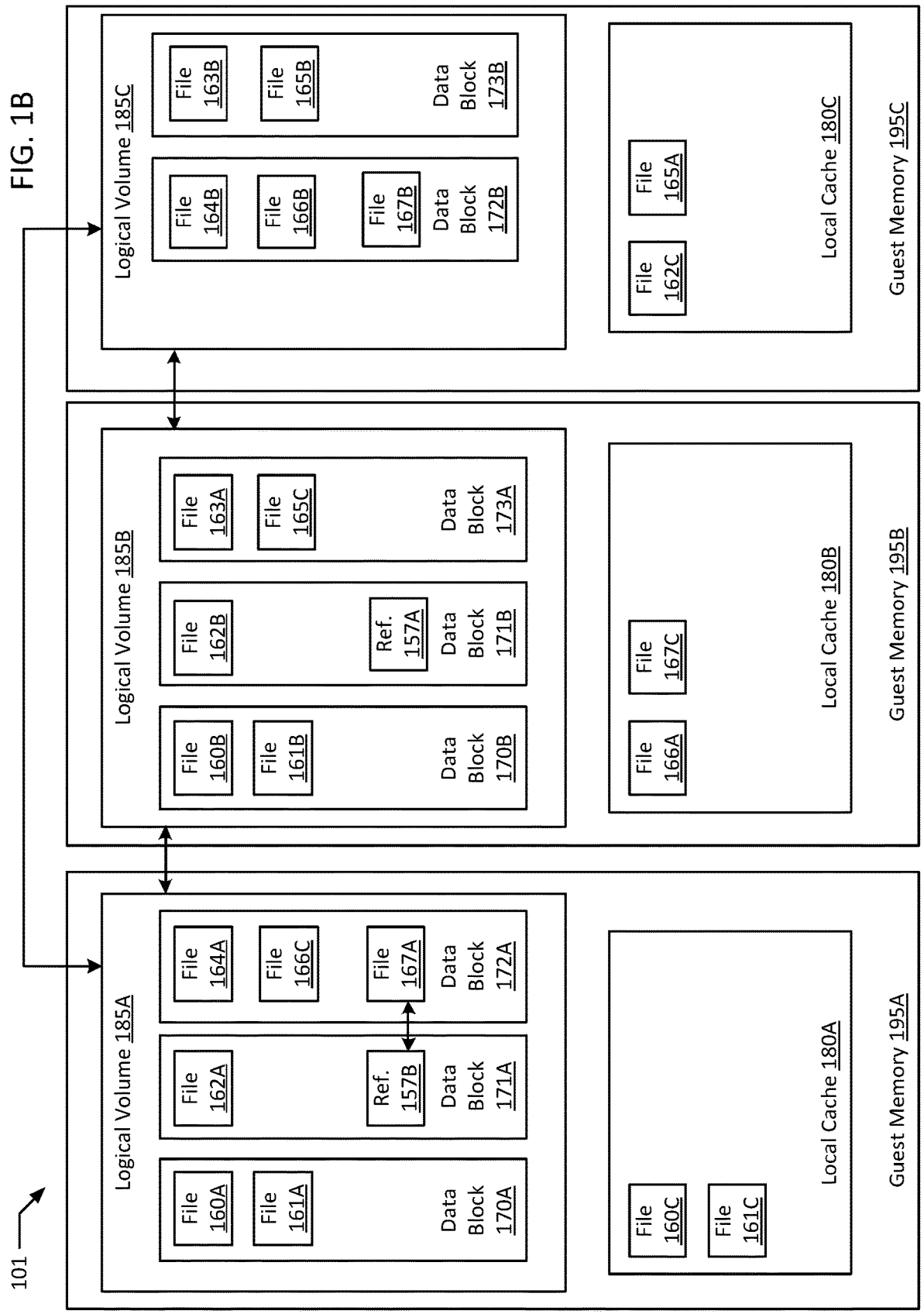

FIGS. 1A-B are block diagrams of a distributed storage system according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refer to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. A RAID array may be configured to increase storage throughput, for example, where a logical storage volume is physically hosted on multiple devices. In an illustrative example, storage throughput may be increased by simultaneously executing a storage operation on two separate disks in a RAID array, effectively doubling the speed at which the file may be written to persistent storage. For example, half of the file is written to the first disk and the other half to the second disk, thereby allowing the write speed of both disks to be used simultaneously. When the file is read, the read speed of both disks is also available for faster retrieval. In a RAID array designed for data security through replication, each piece of data on a given storage device may be saved at least in duplicate across at least two physical devices so that if one device fails, the data on that device may be reconstructed from the remaining copies. RAID arrays may also be implemented using "exclusive or" operations to store, for example, two or more full copies of data across multiple devices which may be reassembled into a full file so long as no more than one (or more if configured to use additional storage space) physical device included in the array suffers a failure. In such arrays (e.g., RAID 5, RAID 6), some of the advantages of both throughput (e.g., RAID 0) and replication (e.g., RAID 1) configurations are realized. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, guest 122, which may in turn host additional virtual environments (e.g., VMs and/or containers). In an example, a container may be a guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system (e.g., host OS 118) or run within another layer of virtualization, for example, in a virtual machine (e.g., guest 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, guest 122 may be a VM or container executing on physical host 110A.

System 100 may run one or more guests (e.g., guest 122), by executing a software layer (e.g., hypervisor 120) above the hardware and below the guest 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to guest 122 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization. In an example, guest 122 may be a virtual machine and may execute a guest operating system 196A which may utilize the underlying VCPU 190A, VMD 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, guest OS 196A hosts service 150A, which may be implemented with any suitable form of executable code (e.g., application, program, script, etc.) to provide a specific processing capability. In an example, service 150A may execute directly on guest OS 196A, or service 150A may be further virtualized, for example, in a container or secondary virtual machine. In an example, storage controller 140A may be implemented with any form of suitable executable code and storage controller 140A controls access to persistent storage (e.g., distributed storage volume 145) for service 150A.

In an example, guests 124 and 126 may be similar virtualization implementations to guests 122, but may, for example, execute separate operating systems (e.g., guest OS 196B-C). In an example, guest OSes 196BC may be incompatible with guest OS 196A and/or host OS 118. In an example, guests 124 and 126 execute on physical host 110B, with VCPU 190B-C, VMD 192B-C, VI/O 194B-C, and guest memory 195B-C virtualizing access to physical CPU 112B-C, MD 114C, and I/O 116B. In an example, services 150B and 150C, along with storage controllers 140B and 140C are hosted on VMs (e.g., guests 124 and 126). In the example, services 150B and 150C, along with storage controllers 140B and 140C are implemented similarly to services 150A and 140A. In an example, a guest virtualization orchestrator (e.g., Red Hat® OpenShift®, Kubernetes®) managing virtual compute resources for system 100. For example, an orchestrator may include a guest scheduler and a network storage scheduler (e.g., Rook®). In the example, the network storage scheduler may be a storage cluster orchestrator managing the deployment of a distributed storage solution (e.g., Red Hat® Ceph®, OpenStack® Swift, Amazon S3®, etc.) that may additionally employ a distributed file system (e.g., Red Hat® GlusterFS®) providing storage in the form of distributed storage volumes (e.g., distributed storage volume 145) deployed across multiple storage hosts (e.g., guests 122, 124, and 126). In an example, storage schedulers and/or guest schedulers may be component parts of an orchestrator. In another example, storage schedulers and/or guest schedulers may be external components in communication with an orchestrator, for example, through an application programming interface ("API"). In an example, any form of suitable network for enabling communications between computing devices, for example, a public network (e.g., the Internet), a private network (e.g., a local area network (LAN) or wide area network (WAN)), or a combination thereof may be employed to connect the component parts of the system (e.g., physical hosts 110A and 110B and their respective guests) to each other. In an example, the various software components of system 100 (e.g., guests 122, 124, and 126, services 150A-C, storage controllers 140A-C, etc.) may be implemented via any suitable form of computing module (e.g., application, executable, script, hardware module, etc.).

In an example, distributed storage volume ("DSV") 145 is a logical storage volume configured by pooling storage provided by multiple host storage devices (e.g., guest memories 195A-C on physical memory devices 114A-C). In the example, individual logical volumes (e.g., logical volumes 185A-C) on the various host nodes for DSV 145 may be combined into a unified, large storage volume combining the capacities of each of the logical volumes (e.g., logical volumes 185A-C) into one unified storage space. In an example, the total capacity of DSV 145 may be lower than the combined capacity of each logical volume (e.g., logical volumes 185A-C) in DSV 145, for example, due to space lost in replicating data between the different logical volumes to protect against data loss due to device failure. In a typical example, at least two copies and preferably three copies of any data item may be stored across different logical volumes in a DSV to provide data security. For example, data may be configured into data blocks (e.g., data blocks 170A-B, 171A-B, 172A-B, 173A-B) or "bricks" that are replicated to other logical volumes. In an example, bricks are organized based on shared access to the contents of the brick. For example, files associated with a given user account of a given application (e.g., service 150A) may be organized into the same brick (e.g., data block 170A) that is replicated to a different logical volume (e.g., as data block 170B). In an example, data for a given user session may be preferentially stored in an logical volume that is on the same physical hardware as the service (e.g., service 150A) providing the processing of the data (e.g., logical volume 185A on guest 122). In the example, data block 170A is stored first on logical volume 185A and then replicated to an logical volume stored on a separate storage device (e.g., logical volume 185B on guest 124) as a replicated data block 170B. In some examples, replication logical volumes may be restricted to separate physical hosts (e.g., physical host 110A vs. 110B), which may provide better data security. In other examples, logical volumes may be deployed in guest storage (e.g., guest memories 195B-C) without regard to underlying physical hardware (e.g., logical volumes 185B and 185C both deployed on physical host 110B). In examples where data is replicated multiple times in a DSV, deploying multiple logical volumes to guests on the same physical hardware may allow for flexibility in terms of deprovisioning and shutting down guests hosting logical volumes even if replicating data between two such logical volumes deployed to the same physical host node provides less security against data loss due to equipment failure or geographically isolated events (e.g., natural or manmade disasters). In addition, a given physical host may be configured with multiple physical storage devices (e.g., memory devices 114A-B on physical host 110A), and therefore replication on the same physical host may still provide redundancy against hardware failures if the guest memories hosting the logical volumes involved in replication are on separate physical storage devices. In some examples, some logical volumes in DSV 145 may be deployed on dedicated storage hardware (e.g., NAS or SAN devices).

In an example, replication between various logical volumes 185A-C of DSV 145 may be configured to utilize full direct copies of data in a given data block (e.g., data blocks 170A to 170B, 171A to 171B, 172A to 172B, and 173A to 173B) in a RAID 0 type of replication operation. In many examples, "exclusive or" type operations such as those typically used in RAID 5 and 6 may be too inefficient to perform with the added network latency between, for example, logical volume 185A and logical volumes 185B-C. However, since logical volumes 185B and C are collocated on the same physical hardware, RAID 5 or 6 type replication may potentially be implemented between logical volumes 185B-C. For example, a typical RAID implementation may include numerous storage devices such as HDDs and SSDs that may be arranged in a RAID array to prevent against the failure of any one storage device. For example, a storage node with three physical devices arranged in a RAID 5 array may be configured to store two full copies of each data item in the RAID array across the three storage devices such that failure of any one HDD can be recovered from by replacing that HDD and recreating the data on it from the other two storage devices. Storage nodes are commonly implemented with RAID 5 or RAID 6 to deliver a combination of performance, capacity, and data redundancy. In a RAID 5 example, a parity bit may be stored one drive in the array, the parity bit calculated based on the corresponding bits to the parity bit in the same physical location on the other drives of the array. Data is typically stored in binary form, where every bit is either a 0 or a 1. In a simplified example for visualization purposes, storage device 1 may store a 1, and storage device 2 may store a 0. In the example, because the data in storage device 1 and storage device 2 is different, a 1 is stored on storage device 3. Therefore if storage device 2 fails, one can calculate that since it may be determined that storage device 1 had different data from storage device 2 due to the 1 stored on storage device 3, storage device 2 must have had a 0. Therefore the data on storage device 2 can be recreated if storage device 2 fails and requires replacement. Since the order of the storage devices is known, one storage device can always store the result of a chain of exclusive or operations and therefore only the effective capacity of one storage device needs to be used to store a "backup" of every other corresponding bit on the other drives. A 3 storage device RAID 5 array then results in a 33% replication overhead, while a 5 storage device RAID 5 array only requires 1 of the 5 storage devices' capacity to be lost resulting in 20% replication overhead. However, as arrays increase in size, storing a second parity bit may be advantageous to guard against the possibility of losing a second storage device to failure before the data in the failed first device is reconstructed, at the cost of another storage device worth of overhead on the array. Otherwise, the loss of two devices would defeat the "exclusive or" calculations for determining what data was on the failed devices. In DSV 145, the individual storage devices (e.g., memory devices 114A-C) on which logical volumes 185A-C are deployed may employ RAID type functionality for data security locally. In addition, various logical volumes or their component data blocks may also be replicated among each other via similar techniques where performance permits. In an example, local caches 180A-C are implemented on physical storage devices that utilize RAID arrays to provide higher throughput and/or resiliency to data loss.

DSV 145 allows for storage capacity in memory devices 114A-C that would otherwise be wasted as overhead to be used for providing persistent storage capacity to services 150A-C, without constricting data to be stored only locally on the same host (e.g., guests 122, 124, and 126) as the applications using the data (e.g., services 150A-C). However, to allow services 150A-C to flexibly scale with demand, at any given point in time a user connecting to one of services 150A-C may require data (e.g., in data blocks 173A-B) that is not stored locally to the instance of the service (e.g., service 150A) the user is connected to. In such instances performing storage operations over a network may impose severe performance penalties on service 150A. In computing, "convergence" refers to collocating the compute resources necessary for the efficient execution of an application such as memory, networking and processing capacity, onto the same physical host to provide performance benefits, which is typically especially beneficial for latency sensitive applications. Taking convergence a step further may include granting control of the compute resources for a given virtual guest (e.g., guest 122) to the same hypervisor (e.g., hypervisor 120) for further efficiency, which is sometimes referred to as "hyperconvergence". In an example, storage controller 140A in conjunction with local cache 180A may provide service 150A with some of the benefits of hyperconvergence, even though the bulk of the high capacity storage requirements of service 150A are handled by DSV 145 distributed among storage devices located physically distant from guest 122.

For example, local cache 180A may be implemented with high performance storage on guest 122. In the example, local cache 180A may be limited in capacity, but may be accessible to service 150A without incurring any network latency. Therefore, rather than, for example, incurring 5-15 ms of latency accessing logical volume 185B directly for each read or write operation to data block 173A, if a copy of data block 173A is cached in local cache 180A, these read or write operations may be performed in microseconds. In an example, when service 150A requests access to a file in data block 173A, storage controller 140A may query a distributed storage volume index 147 of DSV 145 to determine where the file may be located, and may first retrieve the file and/or data block 173A to local cache 180A. In the example, service 150A may then perform all of its data I/O operations on the copy of the file in local cache 180A. Storage controller 140A may then be configured to lazily resynchronize the updated file to DSV 145, for example, when guest 122 has spare computing capacity (e.g., network bandwidth and/or CPU cycles). In an example, local cache 180A may be implemented on high performance storage such as SSD or persistent memory, which are typically configured with internal RAID 5 or RAID 6 implementations. In these examples, the hardware data replication provided by the memory device ultimately hosting local cache 180A (e.g., memory device 114A) may provide a level of data security for the transient period of time between when data is updated in local cache 180A and when the data update is replicated to its original locations on DSV 145 (e.g., data blocks 173A-B) on logical volumes 185B-C hosted on guests 124 and 126 respectively.

In an example, because data synchronization between local cache 180A and DSV 145 is lazily performed asynchronously, with a lag of anywhere from 5 ms to 30 seconds between data updates in local cache 180A, storage controller 140A may have time for compute expensive operations that may reduce storage utilization in DSV 145. For example, storage capacity may be greatly enhanced through implementing compression and/or deduplication on a given storage device. Deduplication may be performed on many different levels, for example, on a block level, a file level, a file system level, or even a storage device level. Similarly, compression may typically be available on a block and/or a file level. A block may typically be a granular denomination of sequence of bits of physical storage in a fixed size that may be addressed and accessed on a storage device, e.g., 512 bytes, 4 kB, 8 kB, 16 kB, 32 kB, etc. In an example, the smaller the block sizes a storage device is divided into, the higher the density of data that can be stored on the device. For example, a 1 kB file may occupy an entire block regardless of how much empty space is left over in the block.

To illustrate deduplication and compression, in an example, an email server may receive an email message with a 1 MB attachment for an entire 1,000 employee company. Without deduplication, the attachment would be stored 1,000 times resulting in 1 GB of storage used. However, since the attachment is identical, with file level deduplication, only one copy actually needs to be stored with virtual links to that copy made to each recipient, resulting in a nearly 99.9% reduction in space usage for this example email message. A typical method of lossless or reversible data compression may entail encoding a file to represent repeated data with short form symbols. For example, "aaaaa" may be represented effectively as "5a" resulting in a 60% savings in space used. Similarly, repeated data may be given a symbol representation and therefore result in significant space savings. For example, a log file for user logins may repeatedly store lines similar to "[User1] successful login from [IP address]." In the example, "successful login from" may be compressed to a single character and therefore a single byte, therefore resulting in a 95% reduction in space from, for example, 21 bytes to 1 byte. In the email server example, if the 1 MB attachment is a text file, the addition of compression may further reduce the storage space taken by upwards of 90%, resulting in an overall 99.99% space savings. Compression and deduplication may be performed at different granularities, with corresponding performance penalties and efficiency advantages. However, compression and deduplication often come with significant performance penalties. In an example, compression or block level deduplication typically slows down file writes by 50-60%, even up to 90%. In addition, many file types may benefit very little from compression or very granular (e.g., block level) deduplication. For example, most commonly utilized storage formats for image and video data are already compressed, so additional compression may result in little to no space savings at the cost of significant latency. The drawbacks to compression and/or deduplication are often in the form of slower writes to storage media with these features enabled.

Local caches 180A-C allow system 100 to implement deduplication and compression for data stored to logical volumes 185A-C without significant performance penalties because the data in local caches 180A-C is not deduplicated or compressed, only the data transferred from local caches 180A-C to logical volumes 185A-C. Since system 100 is configured for services 150A-C to only access persistently stored data through local caches 180A-C respectively, once data is retrieved from DSV 145 to local caches 180A-C, services 150A-C may effectively experience converged/hyperconverged storage performance. The original retrieval of data is slower in system 100 than in a purely converged/hyperconverged system where all data used by a given application is stored locally on the same host, for example, due to time spent querying DSV index 147 and data retrieval across a network, but storage efficiency is greatly increased by allowing unused storage capacity on various hosts to be included in DSV 145 rather than being wasted as overhead. Data is also more secure from loss to software or hardware failure, as well as geographical region impacting events, as it is replicated to dispersed geographical locations, protecting against disaster recovery situations such as blackouts and natural disasters.

System 101 illustrated in FIG. 1B is an expanded view of system 100, specifically of DSV 145 and local caches 180A-C through which guests 122, 124, and 126 access the data in DSV 145. In an example, DSV 145 includes logical volumes 185A-C. For illustrative purposes, logical volumes 185A-C are depicted with data blocks 170A-B, 171A-B, 172A-B, and 173A-B, where each data block is replicated one time to two different logical volumes. In a typical real world implementation, a given data block (e.g., a GlusterFS® brick) may be replicated at least twice to at least three different logical volumes, potentially with at least one copy in a geographically separated location for added data security. In the illustrated example, in an initial state, data blocks 170A-B store files 160A-B and 161A-B; data blocks 171A-B stores files 162A-B; data blocks 172A-B stores files 164A-B and 167A-B; and data blocks 173A-B stores files 163A-B. In each example, the corresponding data blocks (e.g., data blocks 170A and 170B) are replicated copies of each other, same with corresponding files (e.g., files 160A and 160B). In the context of this specification, in numerous instances, actions are performed on files or data blocks stored in replicated form. In such instances, for example, when referring to retrieving a copy of files 160A-B, it is intended that either copy of the replicated pair of files (e.g., file 160A and file 160B) may be retrieved independently and that retrieving either copy is sufficient. In the various examples given in the specification, some actions are intended to be taken on all replicated copies of a file or data block. For example, if files 160A and 160B are to be updated, both copies will be updated. In an example, service 150A retrieves a copy of files 160A-B as file 160C and a copy of files 161A-B as file 161C to local cache 180A for reading. In the example, service 150C retrieves a copy of files 162A-B as file 162C to local cache 180C for reading. In the example, service 180C also saves a new file generated by service 150C as file 165A in local cache 180C. In the example, storage controller 140C determines, for example based on querying DSV index 147 with an identifying signature (e.g., a hash, a checksum) of file 165A, that file 165A is not currently stored in DSV 145. In the example, file 165A is determined to belong to a user associated with data blocks 173A-B, and therefore file 165A is transferred to data block 173B as file 165B. In an example, prior to being stored in data block 173B, file 165A is compressed so that the copy stored in data block 173B (e.g., file 165B) is a compressed file. In an example, file 165B is then replicated to the replicated pair of data block 173B (e.g., data block 173A) on logical volume 185B as file 165C.

In an example, service 150B on guest 124 generates file 166A which is stored to local cache 180B. After querying DSV index 147, storage controller 140B then later transfers file 166A to data block 172B based on a user account associated with both file 166A and data blocks 172A-B. In the example, data block 172B is selected for the initial transfer due to lower latency between storage controller 140B and logical volume 185C than between storage controller 140B and logical volume 185A (e.g., based on storage controller 140B and logical volume 185C being collocated on the same physical host 110B). In the example, file 166B is then replicated across a network to logical volume 185A, specifically into data block 172A. In an example, service 150B also generates file 167C in relation to a different user account associated with data blocks 171A-B. In the example, storage controller 140B determines that file 167C shares an identifying signature (e.g., a hash or checksum) with files 167A-B already stored in DSV 145, specifically in data blocks 172A-B. However, data blocks 172A-B are not associated with the user for whom file 167C was generated, and the user account associated with file 167C may lack permissions to modify data blocks 172A-B. In the example, storage controller 140B, rather than spending extra storage in DSV 145 to store two additional copies of files 167A-B, deduplicates file 167C and stores file 167C in data block 171B as a virtual reference or link to files 167A-B (e.g., as reference 157A). In the example, reference 157A is then replicated to data block 171A as reference 157B. In an example, reference 157A is first stored to logical volume 185B since logical volume 185B is on the same host (e.g., guest 124) as storage controller 140B and service 150B.

FIGS. 2A-D are block diagrams of local caching and file deduplication in a high performance space efficient distributed storage system according to an example of the present disclosure. In example system 200 illustrated in FIG. 2A, DSV 145 is initially populated with two different files each of which is replicated into two copies, the first distinct file being stored as files 160A-B and the second distinct file being stored as files 260A-B, with files 160A-B replicated to logical volumes 185A-B and files 260A-B replicated to logical volumes 185B-C. In the example, service 150A requests storage controller 140A to retrieve files 160A-B for editing. Storage controller 140A then retrieves and stores file 160A as file 160C in local cache 180A.

Example system 201 illustrated in FIG. 2B depicts file 160C after it is modified by service 150A. In the example, file 160C is modified within local cache 180A into file 262A. In the example, file 262A is a different file from either files 160A-B or files 260A-B. In the example, after the modification is committed in local cache 180A, storage controller 140A verifies whether another copy of file 262A exists in DSV 145 at a later time when processing cycles and network bandwidth are available on guest 122. In the example, storage controller 140A may hash file 262A and query DSV index 147 with the hash value to determine if another copy of file 262A is stored in DSV 145. In an example, file 262A may be the result of multiple updates to file 160C. For example, service 150A may continuously modify file 160C. For example, file 160C may be an event log for service 150A, and outputs from service 150A may continuously be written to file 262A. In an example, storage controller 140A waits until a threshold time elapses after the last update to file 262A before starting to determine how to store file 262A to DSV 145 (e.g., when the log file rolls into a new file). In an example, a snapshot is taken for storage periodically of the file as it updates to be stored to DSV 145. In an illustrative example, file 262A is a configuration file associated with service 150A.

Example system 202 illustrated in FIG. 2C depicts system 201 after storage controller 140A determines, during a temporary hiatus in updates to file 160C (and file 262A), that file 262A is not present in DSV 145. In the example, since service 150A originally retrieved file 160A for editing and not for copying to a new file, storage controller 140A updates file 160A with a copy of file 262A (e.g., file 262B) and stores file 262B in local logical volume 185A. In the example, logical volume 185B then replicates the changes to file 160A in file 160B resulting in file 160B becoming another copy of file 262A (e.g., file 262C). In the example, after the changes to the file are stored to logical volumes 185A-B, service 150A further modifies file 262A into file 260C in local cache 180A. In an example, the modification of file 262A to file 260C may occur substantially simultaneously, including in overlapping time with the conversion of file 160A to file 262B and/or the conversion of file 160B to file 262C. In an example, storage controller 140A then queries DSV index 147 with a hash of file 260C and determines that service 150A's latest update has resulted in a file identical to a file already stored in DSV 145 (e.g., files 260A-B). For example, a user of service 150A may have updated its configuration file for service 150A to match that of another user (e.g., a user associated with files 260A-B).

Example system 203 illustrated in FIG. 2D depicts a system 202 after further execution by storage controller 140A. In the example, since file 260C matches files 260A-B, rather than using space in DSV 145 to store another two whole copies of files 260A-B, storage controller 140A determines that the newly updated file may be deduplicated. In the example, files 262B-C in logical volumes 185A-B are updated with references 250A-B, which are references to file 260A and/or 260B. In an example, two copies of reference 250A-B are stored for data security and redundancy purposes. In an example, each reference (e.g., reference 250A and 250B) may refer to one or more of the physical copies of files 260A-B stored in DSV 145 in case one or more copies becomes unavailable. In the example, a full copy of file 260C is kept in local cache 180A for active manipulation by service 150A to enhance data access speed.

Figure 3:
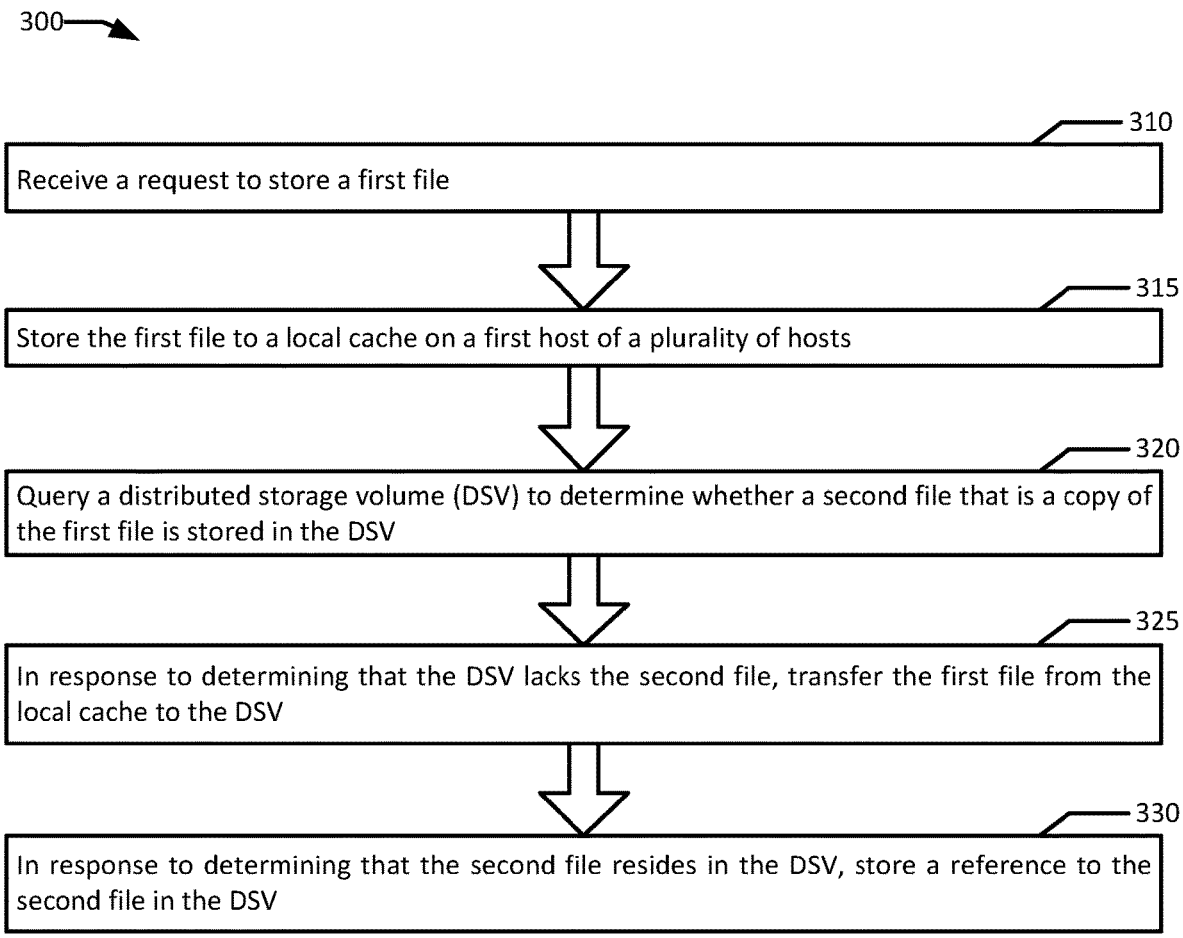
FIG. 3 is flowchart illustrating an example of new file storage to a high performance space efficient distributed storage system according to an example of the present disclosure.

FIG. 3 is flowchart illustrating an example of new file storage to a high performance space efficient distributed storage system according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a storage controller 140A.

Example method 300 may begin with receiving a request to store a first file (block 310). In an example, storage controller 140A receives a request from service 150A to store a file 160C (e.g., a configuration file for service 150A). In the example, guest 122 hosts service 150A and storage controller 140A manages storage operations to persistent storage for guest 122. In an example, guest memory 195A hosts part of a DSV 145 (e.g., logical volume 185A), and guest 122 is configured to recognize all of DSV 145 as a mounted storage volume for guest 122. In the example, storage controller 140A is configured to direct storage I/O operations on guest 122 to a local cache 180A, with actively manipulated data in local cache 180A synchronized lazily with data stored in DSV 145.

The first file is stored to a local cache on a first host of a plurality of hosts (block 315). In an example, file 160C is stored to local cache 180A on guest 122 which is in turn executing on physical host 110A. In an example, local cache 180A is also implemented in guest memory 195A. In an example, a logical storage volume (e.g., logical volume 185A) of DSV 145 is stored in guest memory 195A, which may be implemented in a hard disc drive (e.g., memory device 114A), while local cache 180A is implemented with faster storage in an SSD, (e.g., memory device 114B). In an example, placing local cache 180A in faster memory provides for significant I/O advantages for active operations, allowing for higher I/O per second than is possible with a hard disc. In an example, hard discs may provide more storage capacity in a given form factor than solid state drives, and therefore implementing memory device 114A with hard discs may increase the total storage capacity of physical host 110A, while only minimally impacting storage I/O rates since active I/O is routed through the faster memory device 114B. In such an example, slightly slower initial retrieval times for files may be experienced in exchange for larger capacity. In the example, slower write times are mitigated by writes to memory device 114A only happening asynchronously as data from memory device 114B (e.g., local caches such as local cache 180A) is backed up to logical volumes (e.g., logical volume 185A) hosted in memory device 114A.

A DSV is queried to determine whether a second file that is a copy of the first file is stored in the DSV (block 320). In an example, storage controller 140A queries DSV 145 (e.g., via DSV index 147) to determine if another copy of file 160C is already stored by DSV 145. In the example, storage controller 140A's query may include an identifying signature of file 160C. In various examples, this identifying signature may be a file name, a composite metadata string (e.g., file name, modification time, creation time, etc.), an assigned unique identifier for the file, or a computed value based on the file (e.g., a hash, checksum etc.).

In response to determining that the DSV lacks the second file, transfer the first file from the local cache to the DSV (block 325). In an example, the first file (e.g., file 160C) is replicated to a second host of the plurality of hosts (e.g., guest 124). For example, upon querying DSV index 147 for a match for file 160C, storage controller 140A receives a negative response indicating that no file in DSV index 147 matched file 160C. In the example, file 160C may first be stored to logical volume 185A, which is also located on guest 122, and then a second copy of file 160C may be stored across a network to guest 124 (e.g., in logical volume 185B as file 160B). In various examples, storage controller 140A may instruct logical volume 185B to store file 160B, or a replication service of DSV 140 may detect a change to logical volume 185A (e.g., based on file 160A being written) and replicate the change to another node of DSV 140 (e.g., logical volume 185B). In an example, files stored to DSV 140 may be organized in groups of related files to ensure that these related files are replicated together to the same nodes. In the example, replicating related files together helps to ensure that a given process is unlikely to need to access multiple different logical volumes of DSV 145 in order to complete a given processing task. In an example, file 160C is first added to data block 170A on logical volume 185A, which also included file 161A. In the example, data block 170A is replicated to logical volume 185B as data block 170B. In an example, file 160C is compressed before being stored in logical volume 185A as file 160A. In an example, file 160C may remain uncompressed to provide faster access to service 150A. In an example, compression and/or data transfer to logical volume 185A from local cache 180A may be relegated to background processing, only using CPU time when CPU usage drops below a certain threshold (e.g., 50%).

In response to determining that the second file resides in the DSV, store a reference to the second file in the DSV (block 330). In an example, the reference (e.g., reference 157B) is replicated to the second host (e.g., guest 124). In another example, instead of identifying that file 160C matches none of the files in DSV 145, storage controller 140A identifies that file 160C matches files 167A-B in DSV 145. In the example, when transferring file 160C from local cache 180A to logical volume 185A, a reference 157B to file 167A and/or 167B is stored instead of a copy of file 160C, effectively deduplicating file 160C in regard to DSV 145. In the example, reference 157B is replicated along with its respective data block 171A to logical volume 185B as data block 171B with reference 157A.

In an example, numerous processes may store files to DSV 145 in overlapping operations happening substantially simultaneously. For example, DSV 145 may be deployed over hundreds, even thousands of hosts. In such examples, two storage controllers may, in some cases, store identical files to the DSV 145 before DSV index 147 is updated to indicate that the file is present in the DSV 145. In such circumstances, two sets of replicated groups of the file may then reside in DSV 145. In an example, upon another storage controller further querying DSV index 147 this extra set of copies may be discovered and deduplication may be triggered by replacing one of the sets of replicated files with references to the other set. In various examples, cleanup deduplication may be triggered by a file retrieval request, a file storage request, or by a cleanup process that periodically checks for duplicated identifying signatures in DSV index 147. In an example, files 160A-B and files 167A-B are matching files with matching identifying signatures (e.g., hashes). In the example, upon receiving a file retrieval request to retrieve files 160A-B for editing, this duplication is discovered. In the example, files 160A-B may be replaced with references to files 167A-B, while a copy of file 160A is retrieved as file 160C into local cache 180A for reading or manipulation.

In an example as depicted in system 101 illustrated in FIG. 1B, storage controller 140B stores file 167C (e.g., a copy of files 167A-B) in local cache 180B. In the example, file 167C is associated with a different user and therefore a different data block replication group (e.g., data blocks 171A-B) than files 167A-B. In the example, while file 167C matches files 167A-B, file 167C may be stored to logical volume 185A-B as references 157A-B to files 167A-B. However, upon modification of file 167C such that it no longer matches files 167A-B, a copy of the updated file 167C may be transferred to logical volume 185B and replicated to logical volume 185A to replace references 157A-B. In some instances, a user account associated with file 167C may be restricted from modifying files 167A-B (e.g., due to files 167A-B belonging to a different user account). In an example, the user associated with file 167C may have access to read files 167A-B and may have retrieved its copy of file 167C by copying file 167A or B, but may be restricted from overwriting files 167A-B, and therefore a new copy of the updated version of file 167C is stored in DSV 145 for the user account. In some examples, a super user (e.g., an administrator account, "root" account), for example, may overwrite files 167A-B.

In an example, service 150B instructs storage controller 140B to retrieve files 167A-B for modifying. In the example, storage controller 140B retrieves file 167C from DSV 145 and stores file 167C in local cache 180B. In an example, storage controller 140B detects that service 150B saved changes to file 140B, for example, based on service 150B instructing storage controller 140B to save the changes. In another example storage controller 140B is subscribed to file modification notifications from guest OS 196B. In response to detecting the changes, storage controller 140B updates files 167A-B with the changes to file 167C. In an example, storage controller 140B updates remote logical volumes 185A and 185C with the changes over a network. In another example, storage controller 140B instructs DSV 145 to add or migrate a copy of data blocks 172A-B to logical volume 185B based on the request to modify files 167A-C. For example, a local replicated copy of a data block may allow for faster access, and service 150B requesting data from the remote logical volumes may be indicative that the application using data in data blocks 172A-B (e.g., service 150B) has been migrated to a new host (e.g., guest 124). In the example, keeping at least one replicated copy of a given data block collocated with the processes accessing that data block (e.g., data blocks 172A-B) may provide performance efficiencies based on reduced upload network latency.

Figure 4:
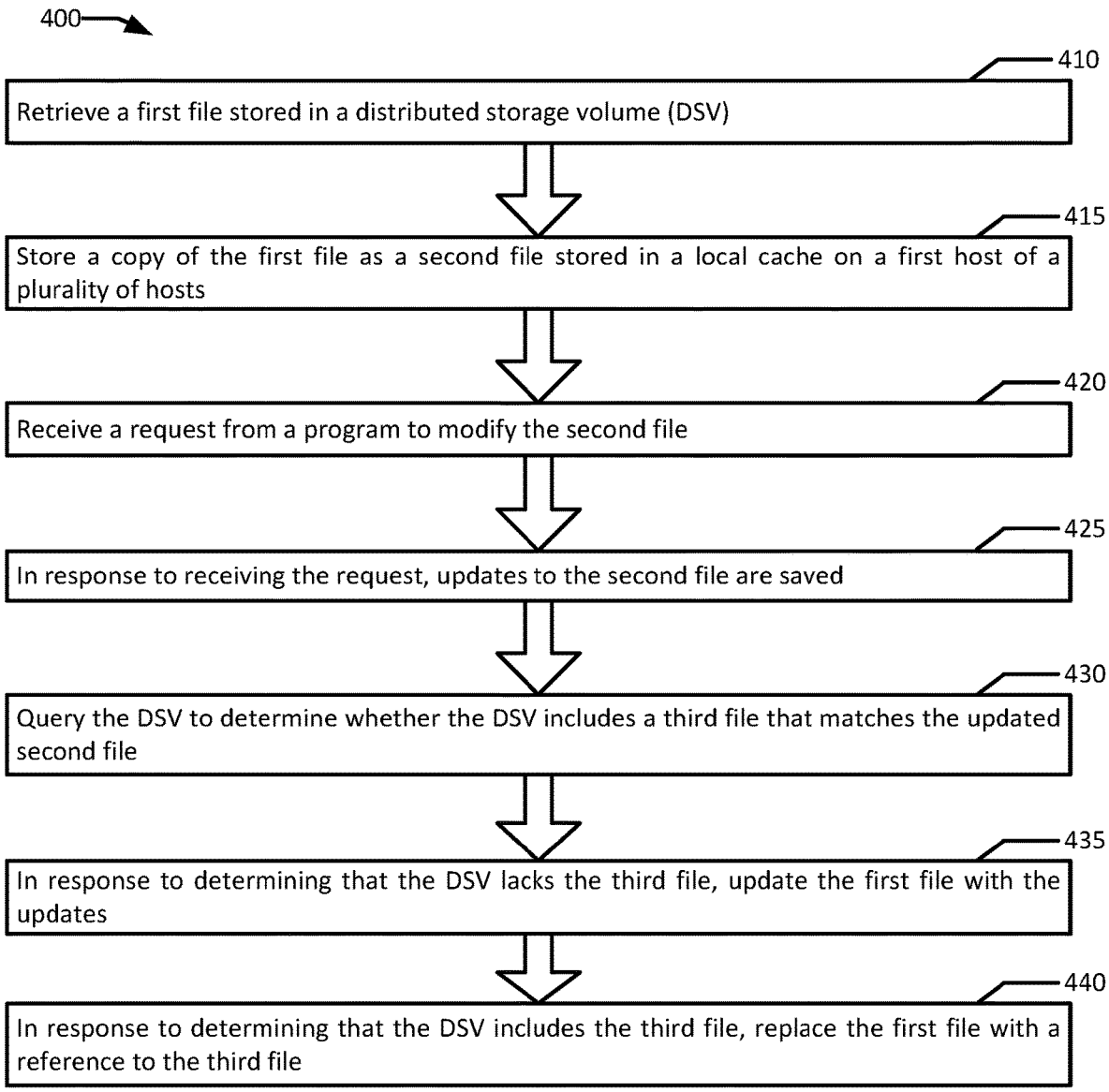
FIG. 4 is flowchart illustrating an example of file updating in a high performance space efficient distributed storage system according to an example of the present disclosure.

FIG. 4 is flowchart illustrating an example of file updating in a high performance space efficient distributed storage system according to an example of the present disclosure. Although the example method 300 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by storage controller 140A.

Example method 400 may begin with retrieving a first file stored in a DSV (block 410). In an example, storage controller 140A may retrieve a copy of files 160A-B stored in DSV 145 as file 160C. In the example, files 160A-B may be stored in compressed form, and may be replicated copies of each other stored in physically separate memories (e.g., guest memories 195A-B on guests 122 and 124 respectively) on separate physical hosts 110A and 110B. In an example, files 160A-B are grouped with files 161A-B in data blocks 170A-B and data block 170A is replicated as a whole into data block 170B.

A copy of the first file is stored as a second file in a local cache on a first host of a plurality of hosts (block 415). In an example, a copy of file 160A or 160B is retrieved and stored as file 160C in local cache 180A. A request is received from a program to modify the second file (block 420). For example, service 150A requests to modify file 160C. In an example, service 150A may actually request to modify file 160A or 160B, but the request to access and/or modify files 160A and/or B is reinterpreted by storage controller 140A as a request to access and/or modify file 160C. In an example, service 150A is configured to only directly interact (e.g., perform I/O operations) on files in local cache 180A. In another example, storage controller 140A is configured to redirect all persistent data I/O operations from service 150A to copies of files stored in local cache 180A.

In response to receiving the request, updates to the second file are saved (block 425). In an example, based on receiving the request to modify file 160C, updates are saved to file 160C in local cache 180A transforming it into file 262A. The DSV is queried to determine whether the DSV includes a third file that matches the updated second file (block 430). In an example, storage controller 140A queries DSV index 147 to determine whether a file in DSV 145 matches file 262A. In various examples, DSV index 147 may be implemented by any suitable means. For example, DSV index 147 may be implemented with centralized index nodes. In another example, DSV index 147 may be implemented as a distributed index that is distributed among the various logical volumes (e.g., logical volumes 185A-C) that make up DSV 145. In such examples, DSV index 147 may be a segmented index divided by any suitable means to allow for rapid search and data retrieval from DSV 145. In an example, an index of indexes may be cached by storage controller 140A that dictates which segmented piece of a distributed DSV index 147 should be queried for a given identifying signature.

In response to determining that the DSV lacks the third file, the first file is updated with the updates (block 435). In an example, storage controller 140A determines that DSV 145 lacks file 262A, and so storage controller updates file 160A in logical volume 185A of DSV 145 to be a copy of file 262A (e.g., file 262B). In an example, logical volume 185A is located on the same host (e.g., guest 122) as storage controller 140A and local cache 180A, and local cache 180A is configured to transfer unduplicated files stored in local cache 180A to logical volume 185A, for example, via storage controller 140A. In an example, instead of being stored on logical volume 185A, file 160A is originally stored on a different logical volume (e.g., logical volume 185C) on a different host (e.g., guest 126). In the example, when file 160A is updated, rather than directly updating logical volume 185C, storage controller 140A first stores the updated file (e.g., file 262A) to local logical volume 185A, before the local copy of the file (e.g., file 262B) is replicated by DSV 145 to overwrite the original copy in logical volume 185C.

In response to determining that the DSV includes the third file, the first file is replaced with a reference to the third file (block 440). In an example, rather than updating file 160C into file 262A, file 160C is updated by service 150A into file 260C. In the example, storage controller 140A detects, based on querying DSV index 147, that file 260C is identical to files 260A-B stored in logical volumes 185B-C of DSV 145. In the example, a reference to file 260A and/or file 260B is stored by storage controller 140A to logical volume 185A as reference 250A, which is then replicated to logical volume 185B as reference 250B. In an alternative example, file 160C is modified into file 262A, which is then further modified into file 260C. In the example, files 262B-C stored in logical volumes 185A-B are replaced with references 250A-B upon confirmation of the updated contents of the file by storage controller 140A (e.g., via hash matching). In an example, where a reference to an existing file in DSV 145 may be substituted for storing an actual copy of a file to DSV 145, storage controllers 140A-C are configured to preferentially store the reference to DSV 145 to conserve space and improve retrieval latency.

Figure 5:
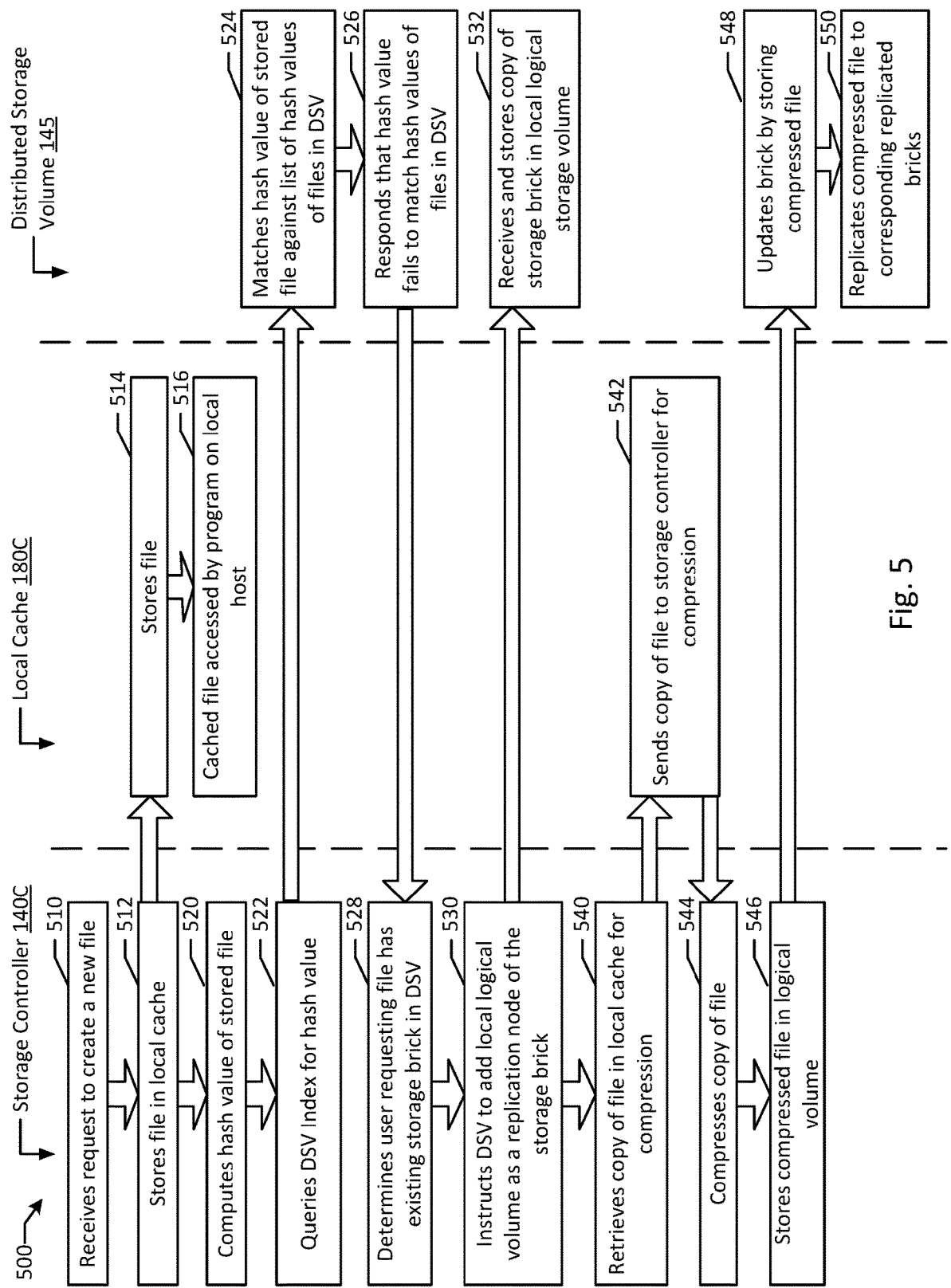
FIG. 5 is flow diagram of an example of new file storage, compression, and replication in a high performance space efficient distributed storage system according to an example of the present disclosure.

FIG. 5 is flow diagram of an example of new file storage, compression, and replication in a high performance space efficient distributed storage system according to an example of the present disclosure. Although the examples below are described with reference to the flow diagram illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, storage controller 140C responds to a file storage request by caching a file to local cache 180C before transferring a compressed version of the file to distributed storage volume 145 for storage and replication.

In example system 500, storage controller 140C receives a request to store a new file 165A (e.g., from service 150C) (block 510). In the example, storage controller 140C first stores file 165A in local cache 185C (block 512). Local cache 180C is configured to store file 165A upon request from storage controller 140C (block 514). In an example, locally cached file 165A is accessed by service 150C on the local host (e.g., guest 126) (block 516). In an example, storage controller 140C computes a hash value of stored file 165A asynchronously with service 150C beginning to access file 165A (block 520). In an example, storage controller 140C queries DSV index 147 with the calculated hash value to determine whether file 165A is a duplicate of another file in DSV 145 (block 522). In an example, DSV index 147 of DSV 145 matches the hash value of file 165A against an indexed list of hash values of files currently residing in the DSV 145 (block 524). In an example, DSV index 147 responds that the hash value fails to match any hash value of any file in DSV 145 (block 526).

In an example, storage controller 140C determines that the user account requesting access to file 165A via service 150C has an existing storage brick (e.g., data block 173A) in DSV 145 (block 528). In the example, storage controller 140C instructs DSV 145 to add logical volume 185C as a replication node for data block 173A (e.g., the storage brick associated with the user account) (block 530). In an example, DSV 145, in the form of logical volume 185C, receives and stores a copy of data block 173A as data block 173B (block 532).

In an example, storage controller 140C retrieves file 165A for compression from local cache 180C (block 540). For example, storage controller 140C begins the transfer process of file 165A to more permanent storage (including initiating compression) based on identifying that file 165A has not been modified for a set threshold time limit. In an example, local cache 180C sends a copy of file 165A to storage controller 140C for compression (block 542). In the example, storage controller 140C compresses the received copy of the file (block 544). In the example, storage controller 140C stores the compressed copy of the file to logical volume 185C as file 165B (block 546). In an example, DSV 145 updates data block 173B by storing the compressed file 165B (block 548). In the example, compressed file 165B is replicated to data block 173A (e.g., a corresponding replicated storage brick to data block 173B) (block 550).

Figure 6:
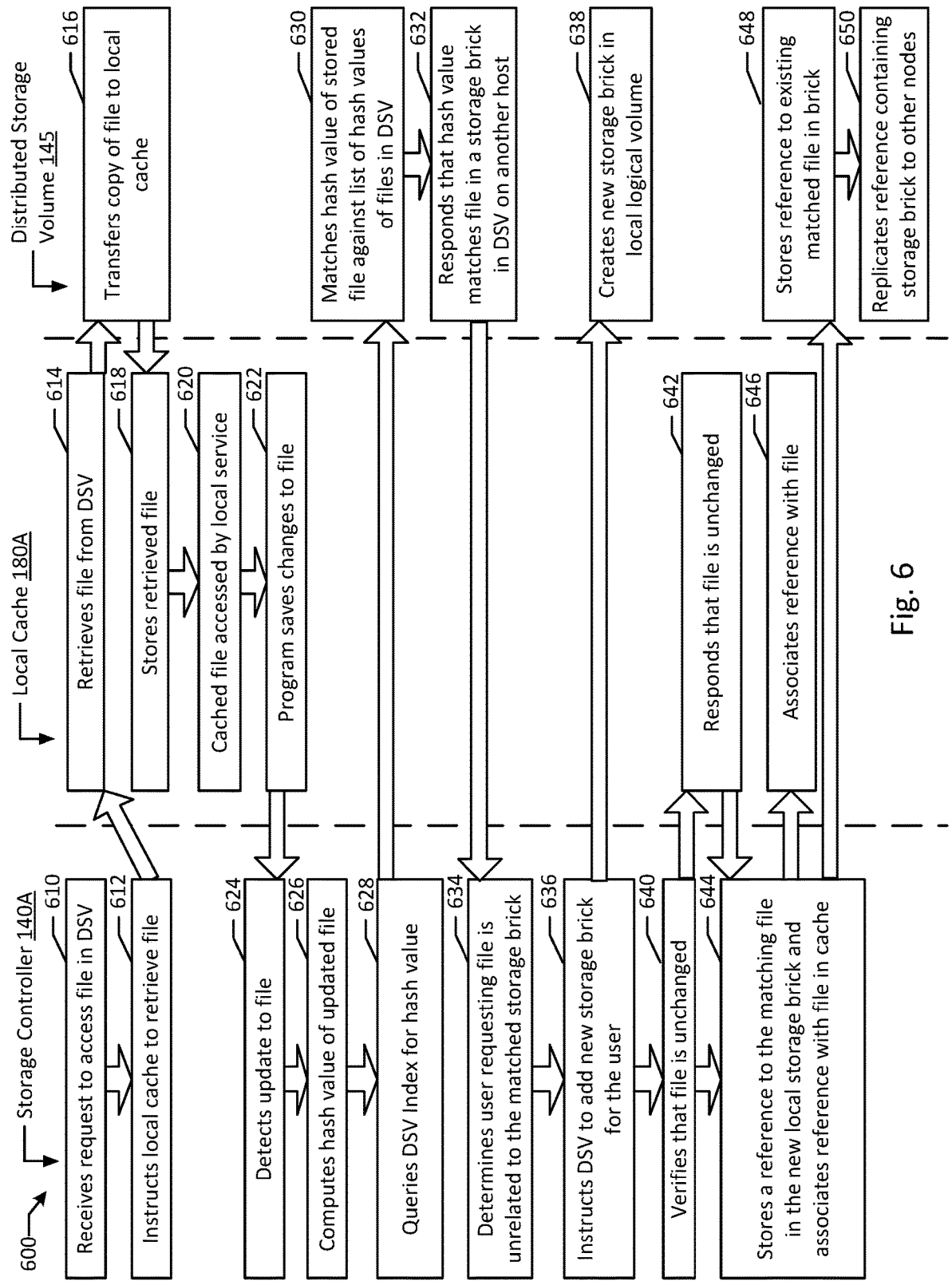
FIG. 6 is flow diagram of an example of file retrieval, updating, deduplication, and replication in a high performance space efficient distributed storage system according to an example of the present disclosure.

FIG. 6 is flow diagram of an example of file retrieval, updating, deduplication, and replication in a high performance space efficient distributed storage system according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, storage controller 140A responds to a file access and subsequent modification request by retrieving the file from DSV 145 to local cache 180A, updating the file in local cache 180A, and storing a deduplicated reference to the updated file back to DSV 145.

In example system 600, storage controller 140A receives a request to access file 160A-B stored in DSV 145 (block 610). In an example, storage controller 140A first queries DSV index 147 to discern the existence of files 160A-B and its stored location(s). In the example, storage controller 140A instructs local cache 180A to retrieve a copy of file 160A (block 612). In the example, local cache 180A retrieves file 160A from DSV 145 (e.g., from logical volume 185A) (block 614). In response, DSV 145 transfers a copy of file 160A to local cache 180A (block 616). Local cache 180A then stores the retrieved file as file 160C (block 618). In an example, cached file 160C is accessed by service 150A (block 620). In the example, service 150A saves changes to file 160C (block 622).

In an example, storage controller 140A detects the update to file 160C (block 624). In some implementations, service 150A may be configured to directly update file 160C and storage controller 140A may detect the update via notification from, for example, guest OS 196A. In other implementations, service 150A may instruct storage controller 140A to update files 160A-B or file 160C, and storage controller 140A may perform the updating of file 160C in response to the request. In an example, storage controller 140A computes a hash value corresponding to the updated version of file 160C (e.g., file 260C) (block 626). In the example, storage controller 140A queries DSV index 147 for the hash value of file 260C (block 628). In response, DSV index 147 matches the hash value of file 260C against a list of hash values of files present in DSV 145 (block 630). In the example, DSV 145 (e.g., DSV index 147) responds that the hash value matches the hash value of a file in a storage brick on logical volumes 185B-C on guests 124 and 126 respectively (block 632). In the example, storage controller 140A determines, based on the response from DSV index 147, which may include metadata related to the existing copies of file 260C (e.g., files 260A-B) in DSV 145, that the user account requesting file 260C is unrelated with the matched storage brick(s) storing files 260A-B (block 634). In the example, storage controller 140A instructs DSV 145 to add a new storage brick corresponding to the user account requesting and modifying file 260C (block 636). In response DSV 145 creates a new storage brick in logical volume 185A collocated with storage controller 140A on guest 122 (block 638).

In an example, storage controller 140A first verifies that file 260C is unchanged since storage controller 140A last computed file 260C's hash value (block 640). In the example, local cache 180A responds that the file is unchanged based on a file modification time (block 642). In other examples, other verification methods may be employed that the file is unchanged, for example, a new hash value may be computed. In an example, storage controller 140A stores reference 250A to matching file 260A and/or replicated matching file 260B in the new storage brick on logical volume 185A and associates reference 250A to file 260C in local cache 180A (block 644). Local cache 180A saves the association between reference 250A and file 260C (block 646). DSV 145 (e.g., logical volume 185A) stores reference 250A to files 260A-B in the newly created brick (block 648). DSV 145 then replicates reference 250A as reference 250B to at least logical volume 185B on guest 124 (block 650).

Figure 7B:
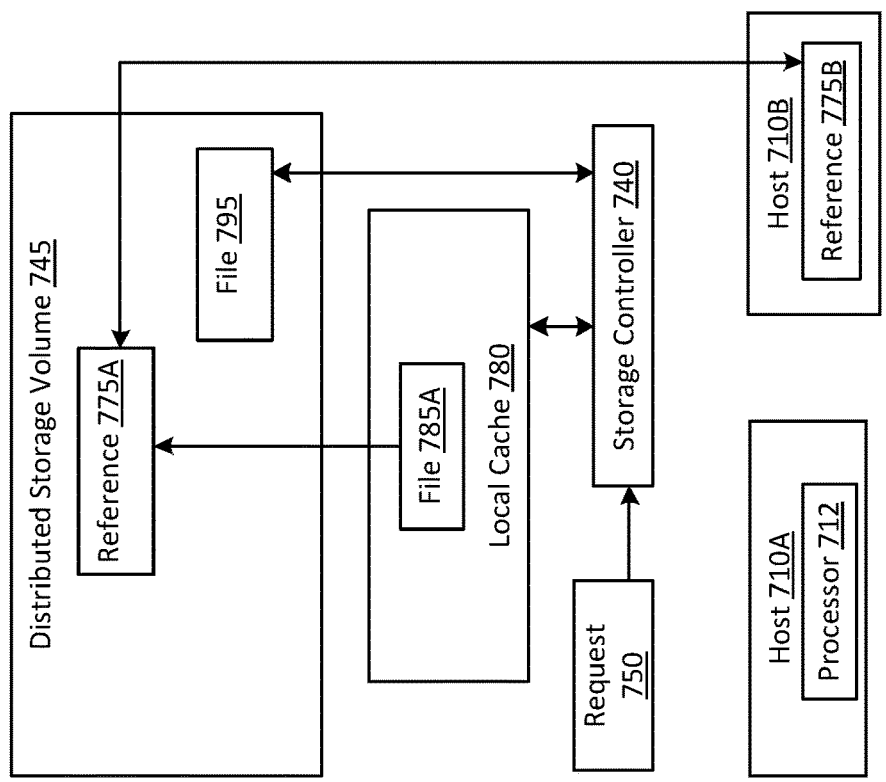
FIG. 7A-B are block diagrams of new file storage to a high performance space efficient distributed storage system according to an example of the present disclosure.
Figure 7A:
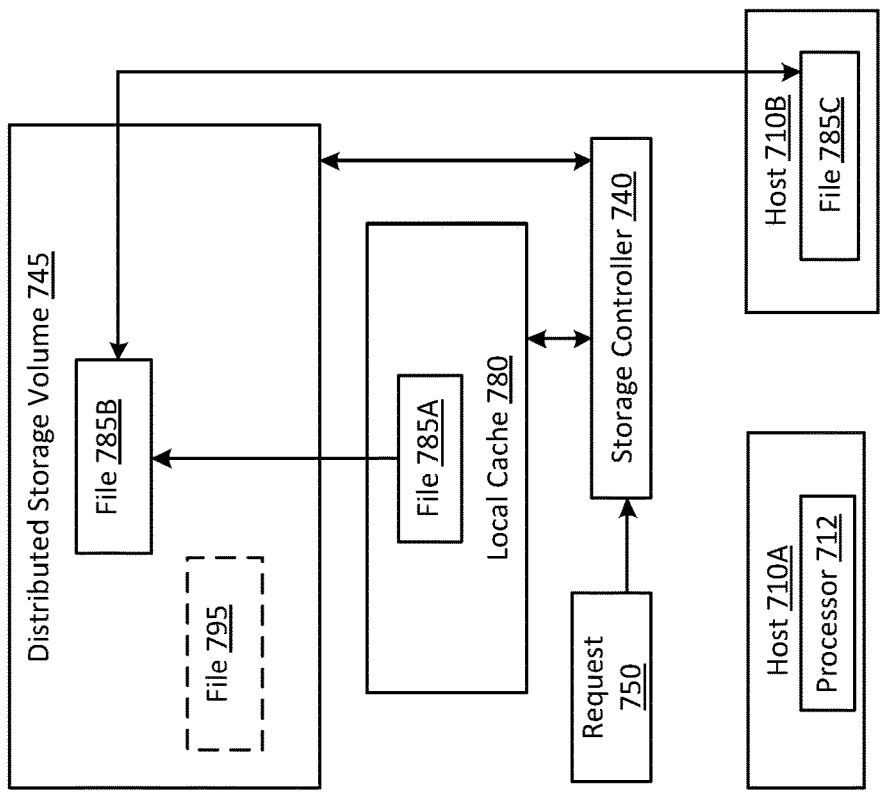

FIG. 7A is block diagram of new file storage to a high performance space efficient distributed storage system according to an example of the present disclosure. Example system 700 includes DSV 745 deployed on hosts 710A-B, where host 710A has a local cache 780 and a storage controller 740 executing on processor 712. Processor 712 receives a request 750 to store file 785A, which is stored to local cache 780. Storage controller 740 queries DSV 745 to determine whether a file 795, which is a copy of file 785A is stored in DSV 745. In response to determining that DSV 745 lacks file 795, file 785A is transferred to DSV 745 as file 785B and then replicated to host 710B as file 785C.

System 701 illustrated in FIG. 7B is a block diagram depicting the alternative scenario to system 700 illustrated in FIG. 7A, where in response to determining that file 795 resides in DSV 745, reference 775A to file 795 is stored in DSV 745, and reference 775A is replicated to host 710B as reference 775B.

Figure 8A:
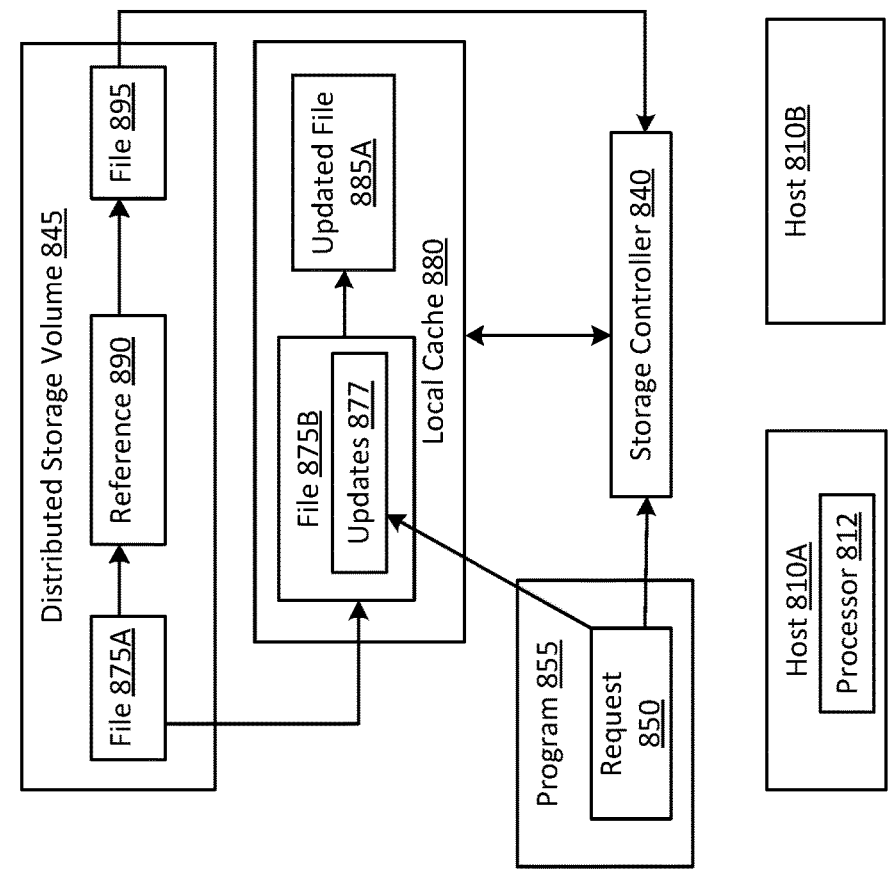
FIG. 8A-B are block diagrams of file updating in a high performance space efficient distributed storage system according to an example of the present disclosure.

FIG. 8A is block diagram of file updating in a high performance space efficient distributed storage system according to an example of the present disclosure. Example system 800 includes DSV 845 deployed on hosts 810A-B. Host 810A, includes local cache 880 and a storage controller 840 executing on processor 812. Storage controller 840 retrieves file 875A stored in DSV 845, which is stored as file 875B in local cache 880. Request 850 is received from program 855 to modify file 875B. In response to receiving request 850, updates 877 are saved to file 875B resulting in update file 885A. Storage controller 840 queries DSV 845 to determine whether DSV 845 includes file 895 that matches updated file 885A. In response to determining that DSV 845 lacks file 895, file 875A is updated with updates 887.

Figure 8B:
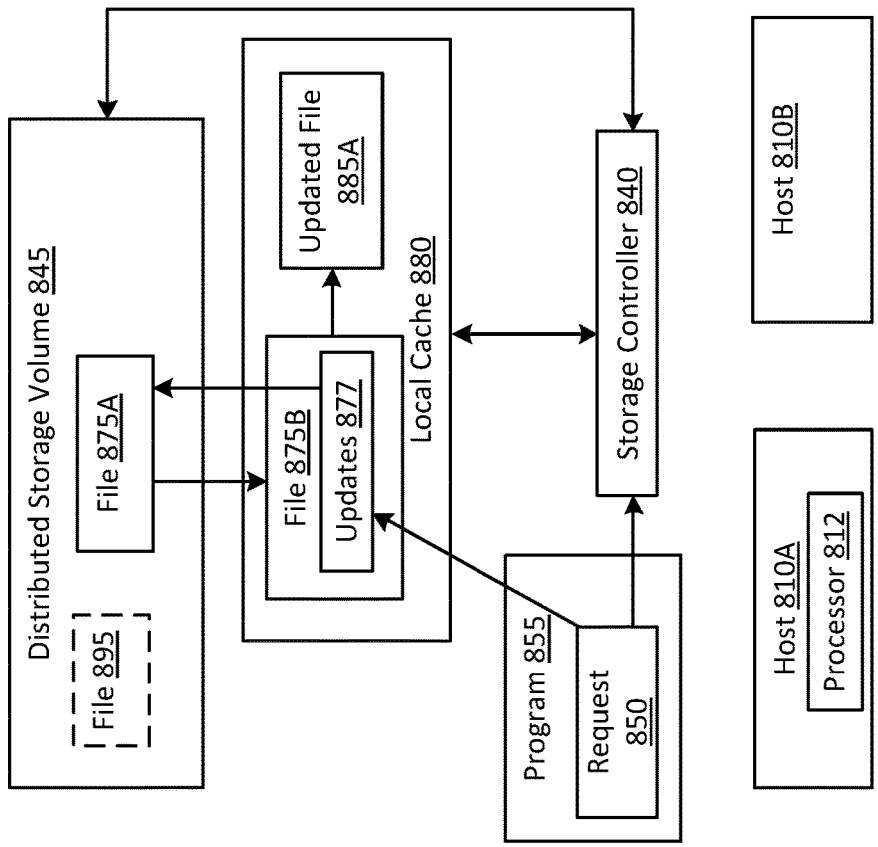

System 801 illustrated in FIG. 8B is a block diagram depicting the alternative scenario to system 800 illustrated in FIG. 8A, where in response to determining that DSV 745 includes file 895, file 875A is replaced with reference 890 to file 895.

High performance space efficient distributed storage systems implemented according to the present disclosure combine the benefits of highly converged, localized storage implementations (e.g., low latency I/O) with the benefits of typical distributed storage systems (e.g., storage capacity, scalability, and data redundancy). While slightly slower on initial file access than purely converged storage solutions, in part due to potentially needing to load information to local caches from across a network, after information resides in local cache, it may be accessed and manipulated as if storage were deployed purely locally to the applications utilizing the information. The advantages of distributed storage systems, which typically result in significant data latency access trade offs, are realized by synchronizing with the distributed storage components of the system asynchronously and lazily, when extra computing power is available. Therefore, data access latency is reduced while storage utilization is increased, resulting in significant improvements to computer data storage efficiency.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a distributed storage volume (DSV) deployed on a plurality of hosts; and a first host of the plurality of hosts with a local cache, and a storage controller executing on a processor to: receive a request to store a first file; store the first file to the local cache; query the DSV to determine whether a second file that is a copy of the first file is stored in the DSV; responsive to determining that the DSV lacks the second file, transfer the first file from the local cache to the DSV, wherein the first file is replicated to a second host of the plurality of hosts; and responsive to determining that the second file resides in the DSV, store a reference to the second file in the DSV, wherein the reference is replicated to the second host.

In accordance with a 2nd exemplary aspect of the present disclosure, which may be used in combination with any one or more of other aspects described herein (e.g., the 1st aspect), wherein prior to transferring the first file to the DSV, the first file is compressed. In accordance with a 3rd exemplary aspect of the present disclosure, which may be used in combination with any one or more of other aspects described herein (e.g., the 1st aspect), wherein the first file is associated with an account that lacks rights to modify the second file, the account instructs the storage controller to update the first file, and the updated first file no longer matches the second file. In accordance with a 4th exemplary aspect of the present disclosure, which may be used in combination with any one or more of other aspects described herein (e.g., the 3rd aspect), wherein the updated first file is first stored in the local cache, and then transferred to the DSV upon determining that the DSV lacks a copy of the updated first file.

In accordance with a 5th exemplary aspect of the present disclosure, which may be used in combination with any one or more of other aspects described herein (e.g., the 1st aspect), wherein the second file matches a third file in the DSV, and the storage controller further executes to: replace copies of the third file in the DSV with copies of the reference to the second file. In accordance with a 6th exemplary aspect of the present disclosure, which may be used in combination with any one or more of other aspects described herein (e.g., the 1st aspect), wherein the first file and the second file are matched based on a shared hash value. In accordance with a 7th exemplary aspect of the present disclosure, which may be used in combination with any one or more of other aspects described herein (e.g., the 1st aspect), wherein a program on the first host requests to modify a third file in the DSV, and the storage controller further executes to: retrieve a copy of the third file from the DSV; store the copy of the third file as a fourth file in the local cache; detect that the program saved changes to the fourth file; and responsive to detecting the changes, update all copies of the third file in the DSV with the changes. In accordance with an 8th exemplary aspect of the present disclosure, which may be used in combination with any one or more of other aspects described herein (e.g., the 7th aspect), wherein the third file is retrieved from a different third host of the plurality of hosts, and the fourth file is saved to a logical storage volume of the DSV on the first host.

In accordance with a 9th exemplary aspect of the present disclosure, which may be used in combination with any one or more of other aspects described herein (e.g., the 1st aspect), wherein a logical storage volume of the DSV is stored in a first memory of the first host, and the local cache is stored in a faster second memory of the first host. In accordance with a 10th exemplary aspect of the present disclosure, which may be used in combination with any one or more of other aspects described herein (e.g., the 1st aspect), wherein the first file is added to a group of related files in the DSV, and the entire group is replicated together to a third host of the plurality of hosts.

Aspects of the subject matter described herein may be useful alone or in combination with one or more other aspects described herein. In a 11th exemplary aspect of the present disclosure, a system comprises a means for receiving a request to store a first file; a means for storing the first file to a local cache on a first host of a plurality of hosts; a means for querying a distributed storage volume (DSV) to determine whether a second file that is a copy of the first file is stored in the DSV; responsive to determining that the DSV lacks the second file, a means for transferring the first file from the local cache to the DSV, wherein the first file is replicated to a second host of the plurality of hosts; and responsive to determining that the second file resides in the DSV, a means for storing a reference to the second file in the DSV, wherein the reference is replicated to the second host.

Aspects of the subject matter described herein may be useful alone or in combination with one or more other aspects described herein. In a 12th exemplary aspect of the present disclosure, a computer-readable non-transitory storage medium storing executable instructions, which when executed by a computer system, cause the computer system to: receive a request to store a first file; store the first file to a local cache on a first host of a plurality of hosts; query a distributed storage volume (DSV) to determine whether a second file that is a copy of the first file is stored in the DSV;

responsive to determining that the DSV lacks the second file, transfer the first file from the local cache to the DSV, wherein the first file is replicated to a second host of the plurality of hosts; and responsive to determining that the second file resides in the DSV, store a reference to the second file in the DSV, wherein the reference is replicated to the second host.

Aspects of the subject matter described herein may be useful alone or in combination with one or more other aspects described herein. In a 13th exemplary aspect of the present disclosure, a method comprises receiving a request to store a first file; storing the first file to a local cache on a first host of a plurality of hosts; querying a distributed storage volume (DSV) to determine whether a second file that is a copy of the first file is stored in the DSV; responsive to determining that the DSV lacks the second file, transferring the first file from the local cache to the DSV, wherein the first file is replicated to a second host of the plurality of hosts; and responsive to determining that the second file resides in the DSV, storing a reference to the second file in the DSV, wherein the reference is replicated to the second host.

In accordance with a 14th exemplary aspect of the present disclosure, which may be used in combination with any one or more of other aspects described herein (e.g., the 11th, 12th, or 13th aspects), further comprises: compressing the first file prior to transferring the first file to the DSV. In accordance with a 15th exemplary aspect of the present disclosure, which may be used in combination with any one or more of other aspects described herein (e.g., the 11th, 12th, or 13th aspects), wherein the first file is associated with an account that lacks rights to modify the second file, the account instructs the storage controller to update the first file, and the updated first file no longer matches the second file. In accordance with a 16th exemplary aspect of the present disclosure, which may be used in combination with any one or more of other aspects described herein (e.g., the 15th aspect), further comprises: first storing the updated first file in the local cache; determining that the DSV lacks a copy of the updated first file; and responsive to determining that the DSV lacks a copy of the updated first file, transferring the updated first file to the DSV.

In accordance with a 17th exemplary aspect of the present disclosure, which may be used in combination with any one or more of other aspects described herein (e.g., the 11th, 12th, or 13th aspects), wherein the second file matches a third file in the DSV, the method further comprises: replacing copies of the third file in the DSV with copies of the reference to the second file. In accordance with an 18th exemplary aspect of the present disclosure, which may be used in combination with any one or more of other aspects described herein (e.g., the 11th, 12th, or 13th aspects), wherein the first file and the second file are matched based on a shared hash value. In accordance with a 19th exemplary aspect of the present disclosure, which may be used in combination with any one or more of other aspects described herein (e.g., the 11th, 12th, or 13th aspects), wherein a program on the first host requests to modify a third file in the DSV, the method further comprises: retrieving a copy of the third file from the DSV; storing the copy of the third file as a fourth file in the local cache; detecting that the program saved changes to the fourth file; and responsive to detecting the changes, updating all copies of the third file in the DSV with the changes. In accordance with a 20th exemplary aspect of the present disclosure, which may be used in combination with any one or more of other aspects described herein (e.g., the 15th aspect), further comprises: retrieving the third file from a different third host of the plurality of hosts; and saving the fourth file to a logical storage volume of the DSV on the first host.

In accordance with a 21st exemplary aspect of the present disclosure, which may be used in combination with any one or more of other aspects described herein (e.g., the 11th, 12th, or 13th aspects), wherein a logical storage volume of the DSV is stored in a first memory of the first host, and the local cache is stored in a faster second memory of the first host. In accordance with a 22nd exemplary aspect of the present disclosure, which may be used in combination with any one or more of other aspects described herein (e.g., the 11th, 12th, or 13th aspects), further comprises: adding the first file to a group of related files in the DSV; and replicating the entire group together to a third host of the plurality of hosts.

Aspects of the subject matter described herein may be useful alone or in combination with one or more other aspects described herein. In a 23rd exemplary aspect of the present disclosure, a system comprises a distributed storage volume (DSV) deployed on a plurality of hosts; and a first host of the plurality of hosts with a local cache, and a storage controller executing on a processor to: retrieve a first file stored in the DSV; store a copy of the first file as a second file in the local cache; receive a request from a program to modify the second file; responsive to receiving the request: save updates to the second file; and query the DSV to determine whether the DSV includes a third file that matches the updated second file; responsive to determining that the DSV lacks the third file, update the first file with the updates; and responsive to determining that the DSV includes the third file, replace the first file with a reference to the third file.

In accordance with a 24th exemplary aspect of the present disclosure, which may be used in combination with any one or more of other aspects described herein (e.g., the 23rd aspect), wherein the program is provided access to the second file in response to a request to access the first file. In accordance with a 25th exemplary aspect of the present disclosure, which may be used in combination with any one or more of other aspects described herein (e.g., the 23rd aspect), wherein the first file is compressed and the compressed first file is replicated to a plurality of memories on the plurality of hosts. In accordance with a 26th exemplary aspect of the present disclosure, which may be used in combination with any one or more of other aspects described herein (e.g., the 23rd aspect), wherein the program lacks rights to modify the third file. In accordance with a 27th exemplary aspect of the present disclosure, which may be used in combination with any one or more of other aspects described herein (e.g., the 26th aspect), wherein the second file is further updated, and the further updated second file is transferred to the DSV replacing one of the first file and the reference to the third file.

In accordance with a 28th exemplary aspect of the present disclosure, which may be used in combination with any one or more of other aspects described herein (e.g., the 23rd aspect), wherein files in the DSV are copied to the local cache, and the program only directly interacts with files in the local cache. In accordance with a 29th exemplary aspect of the present disclosure, which may be used in combination with any one or more of other aspects described herein (e.g., the 23rd aspect), wherein the first file is grouped with a plurality of related files as a group and the group is replicated together. In accordance with a 30th exemplary aspect of the present disclosure, which may be used in combination with any one or more of other aspects described herein (e.g., the 23rd aspect), wherein the first host includes a plurality of memory devices storing a logical volume of the DSV, and the local cache is configured to transfer unduplicated files to the logical volume. In accordance with a 31st exemplary aspect of the present disclosure, which may be used in combination with any one or more of other aspects described herein (e.g., the 23rd aspect), wherein data is replicated between memory devices of the plurality of memory devices. In accordance with a 32nd exemplary aspect of the present disclosure, which may be used in combination with any one or more of other aspects described herein (e.g., the 23rd aspect), wherein the first file is retrieved from a first logical volume of the DSV on a different second host of the plurality of hosts, and one of the second file and the reference to the third file is stored on a second logical volume of the DSV on the first host before the one of the second file and the reference to the third file is replicated to the first logical volume to one of update and replace the first file.

Aspects of the subject matter described herein may be useful alone or in combination with one or more other aspects described herein. In a 33rd exemplary aspect of the present disclosure, a system comprises a means for retrieving a first file stored in a distributed storage volume (DSV); a means for storing a copy of the first file as a second file in a local cache on a first host of a plurality of hosts; a means for receiving a request from a program to modify the second file; responsive to receiving the request: a means for saving updates to the second file; and a means for querying the DSV to determine whether the DSV includes a third file that matches the updated second file; responsive to determining that the DSV lacks the third file, a means for updating the first file with the updates; and responsive to determining that the DSV includes the third file, a means for replacing the first file with a reference to the third file.

Aspects of the subject matter described herein may be useful alone or in combination with one or more other aspects described herein. In a 34th exemplary aspect of the present disclosure, a computer-readable non-transitory storage medium storing executable instructions, which when executed by a computer system, cause the computer system to: retrieve a first file stored in a distributed storage volume (DSV); store a copy of the first file as a second file in a local cache on a first host of a plurality of hosts; receive a request from a program to modify the second file; responsive to receiving the request: save updates to the second file; and query the DSV to determine whether the DSV includes a third file that matches the updated second file; responsive to determining that the DSV lacks the third file, update the first file with the updates; and responsive to determining that the DSV includes the third file, replace the first file with a reference to the third file.

Aspects of the subject matter described herein may be useful alone or in combination with one or more other aspects described herein. In a 35th exemplary aspect of the present disclosure, a method comprises retrieving a first file stored in a distributed storage volume (DSV); storing a copy of the first file as a second file in a local cache on a first host of a plurality of hosts; receiving a request from a program to modify the second file; responsive to receiving the request: saving updates to the second file; and querying the DSV to determine whether the DSV includes a third file that matches the updated second file; responsive to determining that the DSV lacks the third file, updating the first file with the updates; and responsive to determining that the DSV includes the third file, replacing the first file with a reference to the third file.

In accordance with a 36th exemplary aspect of the present disclosure, which may be used in combination with any one or more of other aspects described herein (e.g., the 33rd, 34th, or 35th aspects), further comprises: providing the program with access to the second file in response to a request to access the first file. In accordance with a 37th exemplary aspect of the present disclosure, which may be used in combination with any one or more of other aspects described herein (e.g., the 33rd, 34th, or 35th aspects), further comprises: compressing the first file; and replicating the compressed first file to a plurality of memories on the plurality of hosts. In accordance with a 38th exemplary aspect of the present disclosure, which may be used in combination with any one or more of other aspects described herein (e.g., the 33rd, 34th, or 35th aspects), wherein the program lacks rights to modify the third file. In accordance with a 39th exemplary aspect of the present disclosure, which may be used in combination with any one or more of other aspects described herein (e.g., the 38th aspect), further comprises: further updating the second file; and replacing one of the first file and the reference to the third file with the further updated second file.

In accordance with a 40th exemplary aspect of the present disclosure, which may be used in combination with any one or more of other aspects described herein (e.g., the 33rd, 34th, or 35th aspects), wherein files in the DSV are copied to the local cache, and the program only directly interacts with files in the local cache. In accordance with a 41st exemplary aspect of the present disclosure, which may be used in combination with any one or more of other aspects described herein (e.g., the 33rd, 34th, or 35th aspects), further comprises: grouping the first file with a plurality of related files as a group; and replicating the group together. In accordance with a 42nd exemplary aspect of the present disclosure, which may be used in combination with any one or more of other aspects described herein (e.g., the 33rd, 34th, or 35th aspects), wherein the first host includes a plurality of memory devices storing a logical volume of the DSV, and the local cache is configured to transfer unduplicated files to the logical volume. In accordance with a 43rd exemplary aspect of the present disclosure, which may be used in combination with any one or more of other aspects described herein (e.g., the 33rd, 34th, or 35th aspects), further comprises: replicating data between memory devices of the plurality of hosts. In accordance with a 44th exemplary aspect of the present disclosure, which may be used in combination with any one or more of other aspects described herein (e.g., the 33rd, 34th, or 35th aspects), further comprises: retrieving the first file from a first logical volume of the DSV on a different second host of the plurality of hosts, storing one of the second file and the reference to the third file on a second logical volume of the DSV on the first host; and replicating the one of the second file and the reference to the third file to the first logical volume to one of update and replace the first file.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without dimin- The invention is claimed as follows:

1. A system comprising:
a distributed storage volume (DSV) deployed on a plurality of guests hosting one or more virtual environments, the DSV comprising logical volumes, the logical volumes deployed to memories on distributed physical storage devices, the memories managed by the one or more virtual environments; and
a first guest of the plurality of guests configured to access a local cache, and a storage controller, the storage controller executing on a processor to:
receive a request relating to a first file replicated to the memories;
store the first file in the local cache, update the first file while stored in the local cache, and query the DSV to determine whether a second file that is a replicated copy of the first file is stored in the DSV; and
based on determining from the querying that the second file resides in a logical volume of the logical volumes in the DSV, store a separate reference to the second file in at least one logical volume of the DSV, wherein the separate reference is a virtual reference or link to the second file.

2. The system of claim 1, wherein prior to transferring the first file to the DSV, the first file is compressed.

3. The system of claim 1, wherein updating the first file is is based on an account that lacks rights to modify the second file.

4. The system of claim 3, wherein the updated first file is transferred to the DSV upon determining that the DSV lacks a copy of the updated first file.

5. The system of claim 1, wherein the second file matches a third file in the DSV based on a shared hash value, and the storage controller further executes to:
replace copies of the third file in the DSV with copies of the separate reference to the second file.

6. The system of claim 1, wherein a program on the first guest requests to modify a third file in the DSV, and the storage controller further executes to:
retrieve a copy of the third file from the DSV;
store the copy of the third file as a fourth file in the local cache;
detect that the program saved changes to the fourth file; and
responsive to detecting the saved changes, update all copies of the third file in the DSV with the saved changes.

7. The system of claim 6, wherein the third file is retrieved from a different third guest of the plurality of guests, and the fourth file is saved to the logical volume of the logical volumes of the DSV on the first guest.

8. The system of claim 1, wherein the logical volume of the logical volumes of the DSV is stored in a first memory of the first guest, and the local cache is stored in a faster second memory of the first guest.

9. The system of claim 1, wherein the first file is added to a group of related files in the DSV, and the group of related files is replicated together to a third guest of the plurality of guests.

10. A method comprising:
receiving a request to store a first file, which is a new file generated on a first guest of a plurality of guests hosting one or more virtual environments;
querying a distributed storage volume (DSV) to determine whether a second file that is a copy of the first file is stored in the DSV, wherein the DSV is deployed to memories managed by the one or more virtual environments; and
based on determining from the querying that the second file resides in a logical volume of logical volumes in the DSV, storing a separate reference to the second file in the logical volume of the DSV, wherein the separate reference is replicated to a second guest, and wherein the separate reference is a virtual reference or link to the second file residing in the logical volume in the DSV.

11. A system comprising:
a distributed storage volume (DSV) deployed on a plurality of guests hosting one or more virtual environments, wherein the DSV is deployed to memories managed by the one or more virtual environments; and
a first guest of the plurality of guests configured to access a local cache, and a storage controller, the storage controller executing on a processor to:
receive a request from a program to modify a second file stored in the memories, the second file a replicated copy of a first file replicated to the memories;
responsive to receiving the request:
saving updates to the second file;
querying the DSV to determine whether the DSV includes a third file that matches the updated second file; and
responsive to determining from the querying that the DSV includes the third file, replacing the first file with a separate reference to the third file, wherein the separate reference is a virtual reference or link to the third file residing in a logical volume in the DSV.

12. The system of claim 11, wherein the storage controller executes on the processor to:
responsive to determining from the querying that the DSV lacks the third file, updating a first file with the updates.

13. The system of claim 11, wherein the first file is compressed and the first file is replicated to a plurality of the memories on the plurality of guests.

14. The system of claim 11, wherein the program lacks rights to modify the third file.

15. The system of claim 14, wherein the second file is further updated, and the further updated second file is transferred to the DSV replacing one of the first file and the separate reference to the third file.

16. The system of claim 11, wherein files in the DSV are copied to the local cache, and the program only directly interacts with files in the local cache.

17. The system of claim 11, wherein the first file is grouped with a plurality of related files as a group and the group is replicated together.

18. The system of claim 11, wherein the first guest includes a plurality of memory devices storing a logical volume of the DSV, and the local cache is configured to transfer unduplicated files to the logical volume.

19. The system of claim 11, wherein data is replicated between memory devices of a plurality of memory devices.

20. The system of claim 11, wherein the first file is retrieved from a first logical volume of the DSV on a different second guest of the plurality of guests, and one of the second file and the separate reference to the third file is stored on a second logical volume of the DSV on the first guest before the one of the second file and the reference to the third file is replicated to the first logical volume to one of update and replace the first file.

\* \* \* \* \*